US009851866B2

(12) United States Patent
Goossens et al.

(10) Patent No.: US 9,851,866 B2
(45) Date of Patent: Dec. 26, 2017

(54) PRESENTING AND BROWSING ITEMS IN A TILTED 3D SPACE

(75) Inventors: Thomas Goossens, Paris (FR); Laurent Baumann, Campbell, CA (US)

(73) Assignee: APPLE INC., Cupertino, CA (US)

(*) Notice: Subject to any disclaimer, the term of this patent is extended or adjusted under 35 U.S.C. 154(b) by 2011 days.

(21) Appl. No.: 12/953,366

(22) Filed: Nov. 23, 2010

(65) Prior Publication Data
US 2012/0127156 A1 May 24, 2012

(51) Int. Cl.
*G06T 15/00* (2011.01)
*G06F 3/0482* (2013.01)
*G06F 3/0481* (2013.01)

(52) U.S. Cl.
CPC ........ *G06F 3/0482* (2013.01); *G06F 3/04815* (2013.01)

(58) Field of Classification Search
CPC .......................... G06F 3/04815; G06F 3/0482
USPC .......................... 345/419, 440; 715/767, 853
See application file for complete search history.

(56) References Cited

U.S. PATENT DOCUMENTS

| | | | |
|---|---|---|---|
| 5,295,243 A | 3/1994 | Robertson | |
| 5,847,709 A | 12/1998 | Card et al. | |
| 6,088,032 A | 7/2000 | Mackinlay | |
| 6,259,458 B1* | 7/2001 | Theisen et al. | 345/440 |
| 6,754,660 B1* | 6/2004 | MacPhail | |
| 6,801,229 B1* | 10/2004 | Tinkler | 715/853 |
| 7,620,913 B2* | 11/2009 | Hida et al. | 715/853 |
| D613,300 S | 4/2010 | Chaudhri | |
| 8,201,096 B2* | 6/2012 | Robert et al. | 715/767 |
| 2003/0081012 A1 | 5/2003 | Chang | |
| 2007/0226645 A1* | 9/2007 | Kongqiao et al. | 715/781 |
| 2008/0062141 A1 | 3/2008 | Chandhri | |
| 2008/0307343 A1 | 12/2008 | Robert | |
| 2010/0125816 A1 | 5/2010 | Bezos | |

FOREIGN PATENT DOCUMENTS

| | | |
|---|---|---|
| GB | 2387754 A | 10/2003 |
| WO | WO99/08170 A2 | 2/1999 |
| WO | WO2006/126047 A1 | 11/2006 |

OTHER PUBLICATIONS

International Search Report and Written Opinion issued in international application No. PCT/US2011/060651 on Jul. 26, 2012, 21 pages.
Chin, R., "Three-Dimensional File System Browser", *Crossroads*, ACM, vol. 9, issue 1, Sep. 2002, pp. 16-18.
(Continued)

*Primary Examiner* — Phu K Nguyen
(74) *Attorney, Agent, or Firm* — Ronald Fernando

(57) ABSTRACT

Methods, systems, and computer-readable media for presenting and browsing items in a tilted 3D space are disclosed. In tilted viewing mode, groups of items from several consecutive levels of a hierarchy can be presented in respective browsable parades shown at different depths into a viewable region of the tilted 3D space. The user can browse laterally across each browsable parade, and browse up and down the hierarchy within the tilted 3D space. With the combination of browsing laterally across the parades presented in the viewable region of the tilted 3D space and browsing up and down the hierarchy along the depth dimension of the 3D space, the user can navigate the entirety of the hierarchy in the tilted 3D space.

27 Claims, 18 Drawing Sheets

(56) References Cited

OTHER PUBLICATIONS

"Cover Flow", Wikipedia [online], [retrieved on Aug. 5, 2010]. Retrieved from the Internet: <URL: http://en.wikipedia.org/wiki/Cover_Flow>, 5 pages.

"Exposé (MAC OS X)", Wikipedia [online], [retrieved on Aug. 5, 2010]. Retrieved from the Internet: <URL: http://en.wikipedia.org/wiki/Expos%C3%A9_(Mac_OS_X)>, 7 pages.

"fsn (File System Navigator)", Wikipedia [online], [retrieved on Aug. 5, 2010]. Retrieved from the Internet: <URL: http://en.wikipedia.org/wiki/Fsn>, 2 pages.

"FSN—the IRIX 3D file system tool from Jurassic Park", SiliconBunny [online], [retrieved on Aug. 5, 2010]. Retrieved from the Internet: <URL: http://www.siliconbunny.com/fsn-the-irix-3d-file-system-tool-from-Jurassic-park>, 5 pages.

"fsv—3D File System Visualizer", fsv.sourceforge.net [online], [retrieved on Aug. 5, 2010]. Retrieved from the Internet: <URL: http://fsv.sourceforge.net/>, 3 pages.

Hakala , T., et al., "Spatial Interactive Visualization on Small Screen", ACM International Conference Proceeding Series, Proceedings of the 7th international conference on Human computer interaction with mobile devices & services table of contents, Salzburg, Austria, 2005, ACM, New York, NY, vol. 111, pp. 137-144.

"MonkeyFlow 1.2.1 [MM3]", MediaMonkey [online], [retrieved on Aug. 5, 2010]. Retrieved from the Internet: <URL: http://www.mediamonkey.com/forum/viewtopic.php?t=31402>, 16 pgs.

Shilovitsky, O., "3 Ways to Visualize Hierarchical Structures", Sep. 10, 2009, 3D Perspectives [online], [retrieved on Aug. 5, 2010]. Retrieved from the Internet: <URL: http://perspectives.3ds.com/2009/09/10/3-ways-to-visualize-hierarchical-structures/>, 9 pages.

"Time Machine (Apple Software)", Wikipedia [online], [retrieved on Aug. 5, 2010]. Retrieved from the Internet: <URL: http://en.wikipedia.org/wiki/Time_Machine_(Apple software )>, 7 pages.

"Tree3D Examples", ZeroFractal.com [online], [retrieved on Jun. 23, 2010]. Retrieved from the Internet: <URL: http://components.zerofractal.com/tree3d/live_demo.html>, 3 pages.

Willis, N., "Picture your disk space with 3-D filesystem browsers", Linux [online], [retrieved Aug. 5, 2010]. Retrieved from the Internet: <URL: http://www.linux.com/archive/articles/57717>, 8 pages.

* cited by examiner

700

Causing a first collection of items to be presented along a first path in a two-dimensional (2D) space presented on a display of the device, the first collection of items including child items of a first parent item in a hierarchy of items, and the first collection of items operable to advance along the first path

702

Detecting a first input for instructing a transition from the 2D space to a three-dimensional (3D) space having a raised viewing angle

704

In response to detecting the first input, causing one or more additional collections of items to be presented in a displayed region of the 3D space, each additional collection of items being sibling items of a respective ancestor item of the first collection of items in the hierarchy, and presented along a respective predetermined path at a respective depth into the 3D space, the respective depth being based on a respective level associated with the respective ancestor item in the hierarchy

```
                    ┌──────────────────────────────────────────────┐
                    │ Identifying a hierarchy of items, the hierarchy including a plurality of levels, │
                    │ each item being either a root level item within a root level of the hierarchy or │
                    │ a child item within a first level of the hierarchy that descends from a │
                    │ respective parent item within a second level of the hierarchy above the first │
                    │                          level                │
                    │                                          802  │
                    └──────────────────────────────────────────────┘
                                          │
                                          ▼
                    ┌──────────────────────────────────────────────┐
                    │ Causing a first collection of child items to be presented in a three- │
                    │ dimensional (3D) space in a first viewing mode, wherein the first collection │
                    │ of child items descend from a first parent item in the hierarchy and are │
                    │ presented along a first predetermined path across the 3D space to form a first │
                    │ parade, and wherein in the first viewing mode, the first parade is presented in │
                    │ front of items from one or more levels above a level associated with the first │
                    │ collection of child items and obscures the items from the one or more levels │
                    │                                          804  │
                    └──────────────────────────────────────────────┘
                                          │
                                          ▼
                    ┌──────────────────────────────────────────────┐
                    │ Detecting a first input for raising a viewing angle of the 3D space │
                    │                                          806  │
                    └──────────────────────────────────────────────┘
                                          │
                                          ▼
                    ┌──────────────────────────────────────────────┐
                    │ In response to the first input, causing the hierarchy of items to be presented │
                    │ in a second viewing mode, wherein in the second viewing mode, items │
                    │ within a same level as the first parent item are presented along a second │
                    │ predetermined path across the 3D space to form a second parade, and the │
                    │ second parade is revealed from behind the first parade along a depth │
                    │              dimension of the 3D space.      │
                    │                                          808  │
                    └──────────────────────────────────────────────┘
```

FIG. 8

PRESENTING AND BROWSING ITEMS IN A TILTED 3D SPACE

TECHNICAL FIELD

This disclosure relates generally to providing information on computers and other devices.

BACKGROUND

Many modern computing devices, such as personal computers, smart phones, game devices, handheld computers, GPS devices, and so on employ graphical user interfaces (GUIs) to present information to users and to receive user input for controlling the behavior and functionalities of the underlying computing devices and/or application programs. A typical two-dimensional (2D) GUI of an operating system can be described as a "desktop" metaphor. Visually, a 2D desktop of an operating system provides a background plane on which user interface elements (e.g., icons, windows, lists, tables, etc.) provided by software applications and the operating system can be displayed.

Operating systems of the computing devices can support a digital file system for storing and organizing digital information. The digital information can be stored as items, such as "files" in the file system. The files can be organized in various folders or directories. Each folder can include a collection of zero or more files. Each folder can also include other folders. The files and folders in the file system can form a hierarchical structure. A file path can be constructed for each item (e.g., a file or folder) that lists the item's ancestor items (e.g., folders containing the item either directly or through one or more subfolders) in the file system hierarchy, such that the item can be located according to the file path.

The file system hierarchy can include many levels, and each level can include a large number of items. Various schemes for managing the presentation and layout of the file system hierarchy (or portions thereof) on the desktop have been proposed to improve the organization and navigation of the file system hierarchy.

SUMMARY

This disclosure relates generally to presentation and management of a hierarchy of items in GUIs.

In general, one innovative aspect of the subject matter described in this specification can be embodied in methods that include the actions of: causing a first collection of items to be presented along a first path in a two-dimensional (2D) space presented on a display of the device, the first collection of items including child items of a first parent item in a hierarchy of items, and the first collection of items operable to advance along the first path; detecting a first input for instructing a transition from the 2D space to a three-dimensional (3D) space having a raised viewing angle; and in response to detecting the first input, causing one or more additional collections of items to be presented in a displayed region of the 3D space, each additional collection of items being sibling items of a respective ancestor item of the first collection of items in the hierarchy, and presented along a respective predetermined path at a respective depth into the 3D space, the respective depth being based on a respective level associated with the respective ancestor item in the hierarchy.

Other embodiments of this aspect include corresponding systems, apparatus, and computer programs, configured to perform the actions of the methods, encoded on computer storage devices.

These and other embodiments can each optionally include one or more of the following features.

In some implementations, at least one of the ancestor items is highlighted in the respective path presenting the ancestor item.

In some implementations, at least the additional collection of items containing the first parent item is operable to advance along the respective path associated with the additional collection of items, the respective path including a primary location and one or more secondary locations proximate the primary location, and the first parent item occupying the primary location of the respective path.

In some implementations, the method further include the actions of: detecting a second input for instructing a transition of occupancy at the primary location to a second parent item in the additional collection of items containing the first parent item; and in response to detecting the second input, causing a second collection of items to be presented along the first path in the displayed region of the 3D space, the second collection of items being child items of the second parent item in the hierarchy.

In some implementations, the first path includes a first series of locations, the first series of locations includes a primary location and one or more secondary locations proximate the primary location along the first path, a first item of the first collection of item occupies the primary location of the first path and is a parent item of a second collection of items, and the method further includes the actions of: detecting a second input for browsing down the hierarchy; and in response to detecting the second input: causing the first collection of items and the one or more additional collections of items to recede along a depth dimension of the 3D space; and causing the second collection of items to be presented along a respective path in front of the first collection of items in the displayed region of the 3D space.

In some implementations, the method further include the actions of: while in the second display mode, detecting a second input for browsing up the hierarchy; and in response to detecting the second input, causing the first collection of items and the one or more additional collections of items to advance along a depth dimension of the 3D space, such that items from a level above the levels associated with the one or more additional collection of items become visible in the displayed region of the 3D space.

In general, one innovative aspect of the subject matter described in this specification can be embodied in methods that include the actions of: identifying a hierarchy of items, the hierarchy including a plurality of levels, each item being either a root level item within a root level of the hierarchy or a child item within a first level of the hierarchy that descends from a respective parent item within a second level of the hierarchy above the first level; causing a first collection of child items to be presented in a three-dimensional (3D) space in a first viewing mode, wherein the first collection of child items descend from a first parent item in the hierarchy and are presented along a first predetermined path across the 3D space to form a first parade, and wherein in the first viewing mode, the first parade is presented in front of items from one or more levels above a level associated with the first collection of child items and obscures the items from the one or more levels; detecting a first input for raising a viewing angle of the 3D space; and in response to the first input, causing the hierarchy of items to be presented in a second viewing mode, wherein in the second viewing mode, items within a same level as the first parent item are presented along a second predetermined path across the 3D space to form a second parade, and the second parade is revealed from behind the first parade along a depth dimension of the 3D space.

Other embodiments of this aspect include corresponding systems, apparatus, and computer programs, configured to perform the actions of the methods, encoded on computer storage devices.

These and other embodiments can each optionally include one or more of the following features.

In some implementations, the method further includes the actions of: in the second viewing mode, causing one or more additional levels of items above a level associated with the first parent item to be presented in one or more additional predetermined paths in the displayed region of the 3D space to form one or more additional parades, the one or more additional parades being revealed from behind the second parade at increasing depths along the depth dimension of the 3D space.

In some implementations, a respective ancestor item of the first collection of child items is highlighted in each of the second parade and the one or more additional parades presented in the displayed region of the 3D space.

In some implementations, the hierarchy of items represents a file system hierarchy, and each parent item represents a folder, and child items of the parent item represent content items contained in the folder.

In some implementations, the first collection of child items is operable to advance through a series of locations along the first predetermined path, the series of locations including a primary location and one or more secondary locations proximate the primary location, and each item is presented in a frontal view when occupying the primary location and in an oblique view when occupying one of the secondary locations.

In some implementations, an item currently occupying the primary location is a parent item of a second collection of child items, and the method further includes the actions of: while the hierarchy is presented in the second viewing mode, detecting a second input for browsing down the hierarchy; and in response to the second input: causing the first parade and the second parade to recede along the depth dimension of the 3D space; and causing the second collection of child items to be presented along a third predetermined path to form a third parade, wherein the third parade is presented in front of the first parade in the displayed region of the 3D space, and the first parade and the second parade are revealed from behind the third parade at increasing depths along the depth dimension of the 3D space.

In some implementations, the method further includes the actions of: while the hierarchy is presented in the second viewing mode, detecting a third input for lowering the viewing angle of the 3D space; and in response to the third input, causing the second collection of child items to be presented in the first viewing mode, wherein in the first viewing mode, the third parade including the second collection of child items is presented in front of the first and the second parades in the displayed region of the 3D space along the depth dimension of the 3D space and obscuring the first and the second parades.

In some implementations, the method further includes the actions of: while the hierarchy is presented in the second viewing mode, detecting a second input for browsing up the hierarchy; and in response to the second input: causing the second parade to advance along the depth dimension of the 3D space towards the front of the displayed region of the 3D space; and causing items from a parent level of the first parent item to be presented along a third predetermined path in the 3D space to form a third parade, the third parade being revealed from behind the second parade along the depth dimension of the 3D space.

In some implementations, the method further includes the actions of: while the hierarchy is presented in the second viewing mode, detecting a second input selecting a second parent item from the second parade, the second parent items having a second collection of child items; and in response to the second input: replacing the first collection of child items presented along the first predetermined path with the second collection of child items; causing the second parent item to advance from a secondary location of the second predetermined path to a primary location along the second predetermined path; and highlighting the second parent item at the primary location.

In general, one innovative aspect of the subject matter described in this specification can be embodied in methods that include the actions of: storing a hierarchy of items, the hierarchy including a plurality of levels, each item being either a root level item within a root level of the hierarchy or a child item within a first level of the hierarchy that descends from a respective parent item within a second level of the hierarchy above the first level; presenting a first collection of child items in a three-dimensional (3D) space in a first viewing mode, wherein the first collection of child items descend from a first parent item in the hierarchy and are presented in a first parade browsable along a first dimension across the 3D space, and wherein in the first viewing mode, the first parade are presented at the front of a viewable region of the 3D space while items from levels above a level associated with the first collection of child items are obscured by the first parade; receiving a first user input for raising a viewing angle along a second dimension of the 3D space; and in response to the first user input, presenting the hierarchy of items in the 3D space in a second viewing mode, wherein in the second viewing mode, items within a same level as the first parent item are presented in a second parade browsable along the first dimension across the 3D space, and the second parade is revealed from behind the first parade along a third dimension of the 3D space.

Other embodiments of this aspect include corresponding systems, apparatus, and computer programs, configured to perform the actions of the methods, encoded on computer storage devices.

These and other embodiments can each optionally include one or more of the following features.

In some implementations, in the second viewing mode, presenting one or more additional levels of items above the level associated with the first parent item in one or more additional parades in the viewable region of the 3D space, the second parade and the one or more additional parades being revealed from behind the second parade at increasing depths along the third dimension into the 3D space.

In some implementations, a respective ancestor item of the first collection of child items is highlighted in each of the second parade and the one or more additional parades presented in the viewable region of the 3D space.

In some implementations, the hierarchy of items represents a file system hierarchy, and each parent item represents a folder, and child items of the parent item represent content items contained in the folder.

In some implementations, the first parade is operable to advance through a series of locations along the first dimension across the 3D space, the series of locations including a primary location and one or more secondary locations preceding and succeeding the primary location along the first dimension, and each item is presented in a frontal view when occupying the primary location and in an oblique view when occupying one of the secondary locations.

In some implementations, the method further include actions of: while the hierarchy is presented in the second view mode, receiving a second user input for browsing the first parade in a first direction along the first dimension of the 3D space; and in response to the second user input: advancing the first collection of child items in the first parade in the first direction along the first dimension of the 3D space; and presenting a first item entering the primary location in the frontal view and one or more second items entering the secondary locations in the oblique view.

In some implementations, the first item entering the primary location is a parent item of a second collection of child items, and the method further include: while the hierarchy is presented in the second view mode, receiving a third user input for browsing down the hierarchy; and in response to the third user input: pushing the first parade and the second parade back along the third dimension of the 3D space; and presenting the second collection of child items in a third parade browsable along the first dimension across the 3D space, wherein the third parade is presented at the front of the viewable region of the 3D space, and the first parade and the second parade are revealed from behind the third parade at increasing depths along the third dimension into the 3D space.

In some implementations, the methods further include: while the hierarchy is presented in the second view mode, receiving a fourth user input for lowering the viewing angle along the second dimension of the 3D space; and in response to the fourth user input, presenting the second collection of child items in the first viewing mode, and wherein in the first viewing mode, the third parade including the second collection of child items is presented at the front of the viewable region of the 3D space while items from levels above a level associated with the second collection of child items are obscured by the third parade.

In some implementations, the methods further include: while the hierarchy is presented in the second view mode, receiving a second user input for browsing up the hierarchy; and in response to the second user input: bringing the second parade forward along the third dimension of the 3D space to the front of the viewable region of the 3D space; and presenting items from a parent level of the first parent item in a third parade browsable along the first dimension across the 3D space, the third parade being revealed from behind the second parade along the third dimension of the 3D space.

In some implementations, the methods further include: while the hierarchy is presented in the second view mode, receiving a second user input selecting a second parent item from the second parade, the second parent items having a second collection of child items; and in response to the second user input: replacing the first collection of items from the first parade using the second collection of child items; advancing the second parent item from a secondary location of the 3D space into a primary location in the 3D space along the first dimension of the 3D space; and highlighting the second parent item at the primary location.

Particular embodiments of the subject matter described in this specification can be implemented to realize one or more of the following advantages.

When a hierarchy of items is presented within a three-dimensional (3D) space, a respective 3D browsable parade can be used to present a collection of items within each folder in the hierarchy. To accommodate the limited size of the display screen, sometimes, only a portion of the hierarchy is visible on the display screen at a time. Each 3D browsable parade can be browsable along a first dimension (e.g., a lateral dimension) across the 3D space, and associated with at a respective depth along a second dimension (e.g., a depth dimension) into the 3D space. The user can browse up and down the hierarchy in the 3D space, and laterally within each browsable parade to locate the folder and/or item of interest.

In some implementations, the browsable parade for the child items within a folder of interest (e.g., a currently selected folder) can be displayed at the front of the viewable region of the 3D space on the display screen. In a first display mode, the viewing angle of the 3D space is small relative to a ground plane on which the 3D browsable parade is presented. Therefore, the browsable parade at the front of the viewable region of the 3D space can obscure the browsable parades for higher levels of the hierarchy that are located behind the front browsable parade. In the first viewing mode, items can occupy a larger area of the display screen, and the user can browse and review each item within the current folder of interest with ease.

The user can raise the viewing angle of the 3D space to display the file system hierarchy in a second viewing mode. In the second viewing mode, one or more additional parades can be revealed from behind the front parade at increasing depths into the 3D space. The ancestor folders of the items displayed in the front parade can be indicated in the one or more additional parades behind the front parade. The additional parades that are revealed can help user understand the relationship between the items in the front parade and other items in the hierarchy.

While in the second viewing mode, the user can browse up to higher levels of the hierarchy by selecting an item in one of the higher-level parades currently visible on the display screen. Alternatively, the user can scroll up to bring the higher-level parades forward toward the front of the viewable region of the 3D space, such that additional higher-level parades can move forward along the depth dimension of the 3D space into the viewable region of the 3D space. The user can also browse down the hierarchy by scrolling down to reveal the child items of a folder shown in the front parade. The presentation of browsable parades in successive rows into the 3D space conforms to an intuitive description of the user's understanding of the hierarchy structure. The manners that the user can browse the hierarchy laterally and along the depth dimension of the 3D space offer a fast and efficient way for the user to review a large number of items within the hierarchy.

In general, another innovative aspect of the subject matter described in this specification can be embodied in methods that include the actions of: presenting a plurality of items in a plurality of rows in a three-dimensional (3D) space, each row extending along a first dimension across the 3D space and associated with a respective depth along a second dimension into the 3D space, the plurality of rows being presented from a first viewing angle, and items in a first row partially obscuring items in a second row behind the first row along the second dimension into the 3D space; receiving a first user input browsing in a first direction along the second dimension; and in response to the first user input, advancing the plurality of rows in the first direction along the second dimension of the 3D space.

Other embodiments of this aspect include corresponding systems, apparatus, and computer programs, configured to perform the actions of the methods, encoded on computer storage devices.

These and other embodiments can each optionally include one or more of the following features.

In some implementations, the methods further include the actions of: receiving a second user input raising the viewing angle along a third dimension of the 3D space; and in response to the second user input, decreasing the amount of obscuration that the items in the first row makes on the items in the second row behind the first row.

In some implementations, the methods further include the actions of: receiving a second user input varying the spacing between the plurality of rows along the second dimension of the 3D space; and in response to the second user input, varying the amount of obscuration that the items in the first row makes on the items in the second row behind the first row according to the varied spacing between the plurality of rows along the second dimension of the 3D space.

The details of one or more implementations of the methods, systems, and computer-readable media are set forth in the accompanying drawings and the description below. Other features, aspects, and advantages of the subject matter will become apparent from the description, the drawings, and the claims.

BRIEF DESCRIPTION OF THE DRAWINGS

FIG. 7 is a flow diagram of another exemplary process for presenting a hierarchy in a 3D space and transitioning from a first viewing mode to a second viewing mode.

FIG. 8 is a flow diagram of another exemplary process for presenting a hierarchy in a 3D space and transitioning from a first viewing mode to a second viewing mode.

Like reference symbols in the various drawings indicate like elements.

DETAILED DESCRIPTION

Overview

Figure 1A:
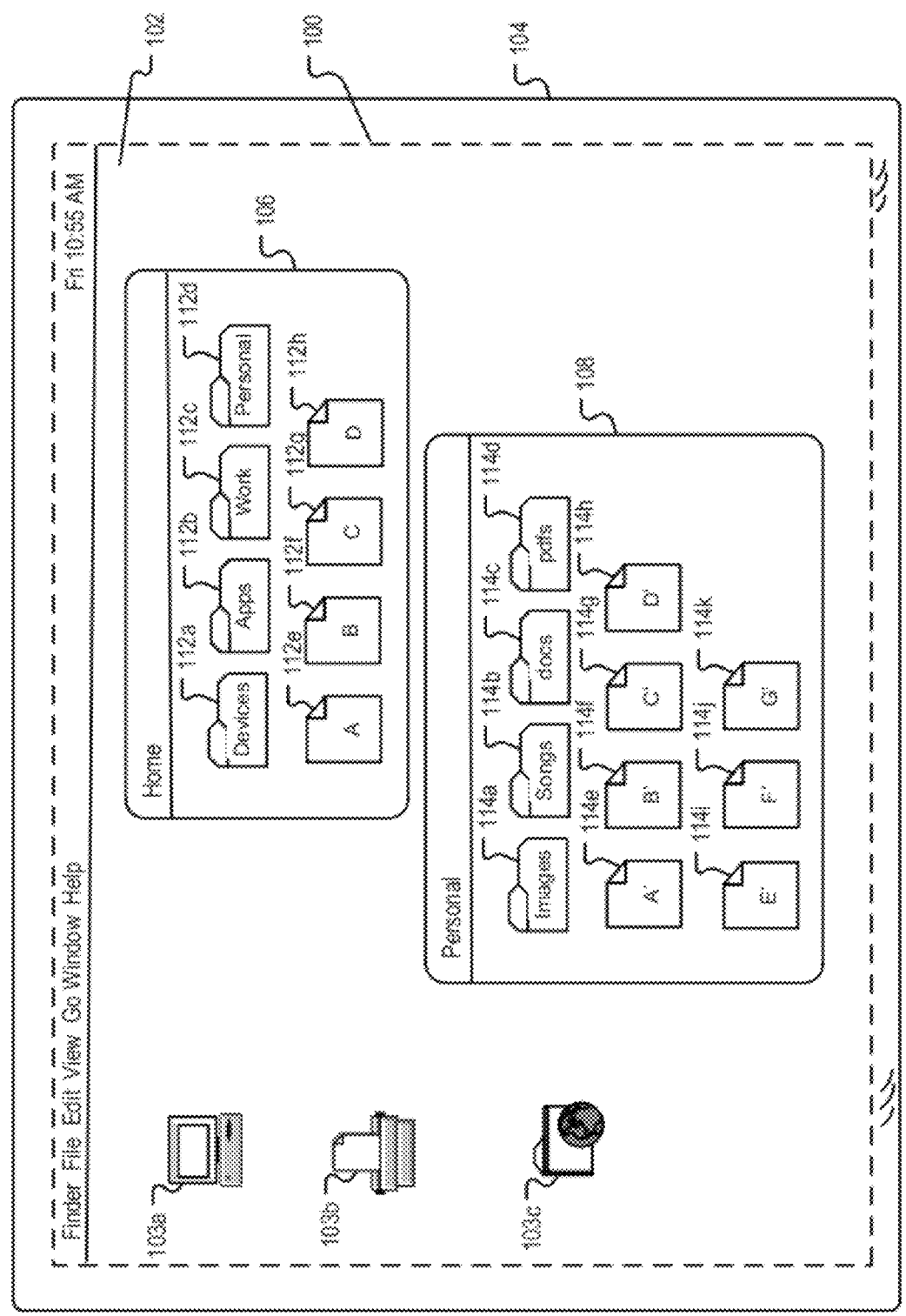
FIG. 1A illustrates an exemplary 2D desktop containing open windows showing items within a portion of a file system hierarchy.

Computing systems, such as personal computers, handheld devices, smart phones, gaming devices, portable computers, and so on, typically include hardware components such as a processing unit (e.g., one or more processors), memory, and various input and output devices (e.g., a display, a keyboard, a mouse, a touch-sensitive surface). Many operating systems and software applications employ graphical user interfaces (GUIs) to present information to users and to receive user input for controlling the behavior and functionality of the underlying computing devices and/or application programs. A typical two-dimensional GUI of an operating system can be described as a "desktop" metaphor.

Visually, a 2D desktop of an operating system can provide a background (e.g., a desktop plane) on which other graphical objects, such as icons representing connected peripheral devices (e.g., disk drives, network devices, printers, etc.), installed programs, stored documents, open windows of executing application programs, file system folders, and so on, can be presented. In addition, user interface elements that allow user interaction with some aspects of the operating system and application programs can be presented at various locations on the desktop as well.

Digital information can be stored on a computing device. The digital information can be stored as items, such as files, in a file system of the operating system. Files can be organized into different folders or directories, and each folder can be placed into a parent folder. Each folder can include a collection of zero or more items, including files, subfolders, or both. The files and folders in the file system can form a hierarchical structure. A file path can be constructed for each item (e.g., a file or folder) that successively lists the item's ancestor items (e.g., the folders containing the item directly or through one or more subfolders) in the file system hierarchy. Each item within the file system hierarchy can be located according to the item's file path.

The file system hierarchy can include one or more levels, and each level can include a large number of items. The organization and navigation of the file system hierarchy are important features of an operating system interface that affect a user's operation efficiency.

As described herein, items within different levels of the file system hierarchy are presented in respective browsable parades at different depths along a depth dimension into the 3D space. In a first viewing mode, the viewing angle is small relative to a ground plane in the 3D space on which the browsable parades are presented. The items within a folder of interest are displayed in a browsable parade at the front of the viewable region of the 3D space, obscuring the browsable parades for higher-level items in the hierarchy.

From the first viewing mode, the user can switch to a second viewing mode, where the viewing angle is raised along a second dimension (e.g., a vertical or height dimension) of the 3D space. In the second viewing mode, one or more additional browsable parades are revealed from behind the front parade at increasing depths along the depth dimension of the 3D space. Each of the additional parades includes items that belong to the same folder as an ancestor item of the items in the front parade. In some implementations, the ancestor item of the items in the front parade shown in each of the additional parades can be presented at a central location along the lateral dimension of the 3D space.

The user can browse laterally through each browsable parade currently visible in the viewable region of the 3D space. The user can also browse up and down the hierarchy to bring additional higher-level parades forward into the viewable region of the 3D space, or pull additional lower-level parades backward into viewable region of the 3D space. As the viewable region of the 3D space is limited, at any time, a fixed number of parades (or rows of items) are visible in the viewable region of the 3D space.

The user can navigate the entire file system hierarchy using a combination of the lateral browsing within a parade currently visible in the viewable region of the 3D space and the browsing up and down the hierarchy along the depth dimension of the 3D space. The 3D user interface can take advantage of the user's ability to recognize and understand spatial relationships of objects in the 3D space, and allow intuitive and efficient navigation, review, and selection of items within the file system hierarchy.

In some implementations, the 3D presentation and navigation of items within a file system hierarchy can be applied to other kinds of data hierarchies, such as a product inventory hierarchy, company organization hierarchy, distributed website map hierarchy, and so on.

In some implementations, the 3D user interfaces for organizing a large number of items into successive rows into the depth dimension of the 3D space, and for browsing along the depth dimension of the 3D space can be applied to non-hierarchical data items. From a raised viewing angle, a large number of rows can be simultaneously visible within the viewable region of the 3D space on the display screen, and the user can quickly browse through and review a large number of items in the different rows even though the items may be partially obscured by other items in front.

Exemplary User Interfaces for Presenting and Browsing Items in a 3D Space

FIG. 1A illustrates an exemplary 2D desktop 100 containing open windows showing items within a file system hierarchy.

In some implementations, the 2D desktop 100 can be depicted as a 2D background plane 102 on which graphical objects can be presented. For example, on the background plane 102, a number of icons (e.g., icons 103*a-c*) representing peripheral devices (e.g., a disk or a printer) and a networked file folder can be presented. The background plane 102 has the appearance of being substantially co-planer or parallel to the display surface of an underlying hardware screen 104. One or more open windows can be presented on the 2D desktop. The one or more open windows can be used to present user interfaces of active applications executing in the operating system, or presenting items of one or more folders in the operating system's file system hierarchy.

For example, as shown in FIG. 1A, two open windows 106 and 108 are presented on the desktop background plane 102. The window 106 represents a file folder "Home," and the window 108 represents a file folder "Personal." The window 106 includes graphical representations (e.g., icons 112*a-h*) of items within the folder "Home," such as files (e.g., represented by icons 112*e-h*) or other folders (e.g., represented by icons 112*a-d*). Similarly, the window 108 includes graphical representations of items within the folder "Personal," such as files (e.g., represented by icons 114*e-k*) or other folders (represented by icons 114*a-d*). The folder "Personal" is a subfolder within the folder "Home," and therefore, the folder "Home" is a parent folder for the folder "Personal."

To open the windows representing file system folders (e.g., the windows 106 and 108) to show the content of the folders, a user can start from a root operating system folder (e.g., represented by the icon 103*a*), and then select to open successive subfolders from within the open windows for the parent folders of the subfolders until a desired folder or item is reached.

For example, to open the window 108, the user can first open the window 106 for the folder "Home" from a window for the parent folder of the folder "Home." Then, the user can select and invoke the icon 112*d* representing the "Personal" folder within the window 106. In response to the user's selection of the icon 112*d*, the window 108 for the "Personal folder" can be opened and presented on the desktop 102.

Although the user can see the relationship between the folder "Home" and the folder "Personal" by noting that the window 106 for the folder "Home" includes an icon 112*d* for the folder "Personal," such indications of relationships between items (e.g., folders and files) within the file system hierarchy can easily get lost when intermediate windows are closed or moved, or when a large number of open windows are displayed on the desktop background plane 102.

In some implementations, to facilitate the user's review and navigation of the file system hierarchy to locate an item of interest, a 2D tree-shaped representation of the file system hierarchy can be presented on the 2D desktop. In the tree-shaped representation of the file system hierarchy, each item (e.g., a file or folder) within the file system can be represented by a node in the tree-shaped representation. The tree-shaped representation can include one or more root level nodes (e.g., storage disks) from which all other nodes of the tree-shaped representation descend. Each non-root-level node can descend from a parent node, where the non-root-level node represents an item contained in a folder represented by the parent node. Further, each node may also have one or more child nodes that descend from the node, where the node represents the folder containing the items represented by the one or more child nodes. At the leaf ends of the tree-shaped representation, nodes that do not have any child nodes, or in other words, the leaf nodes, represent files that do not contain any other items.

Figure 1B:
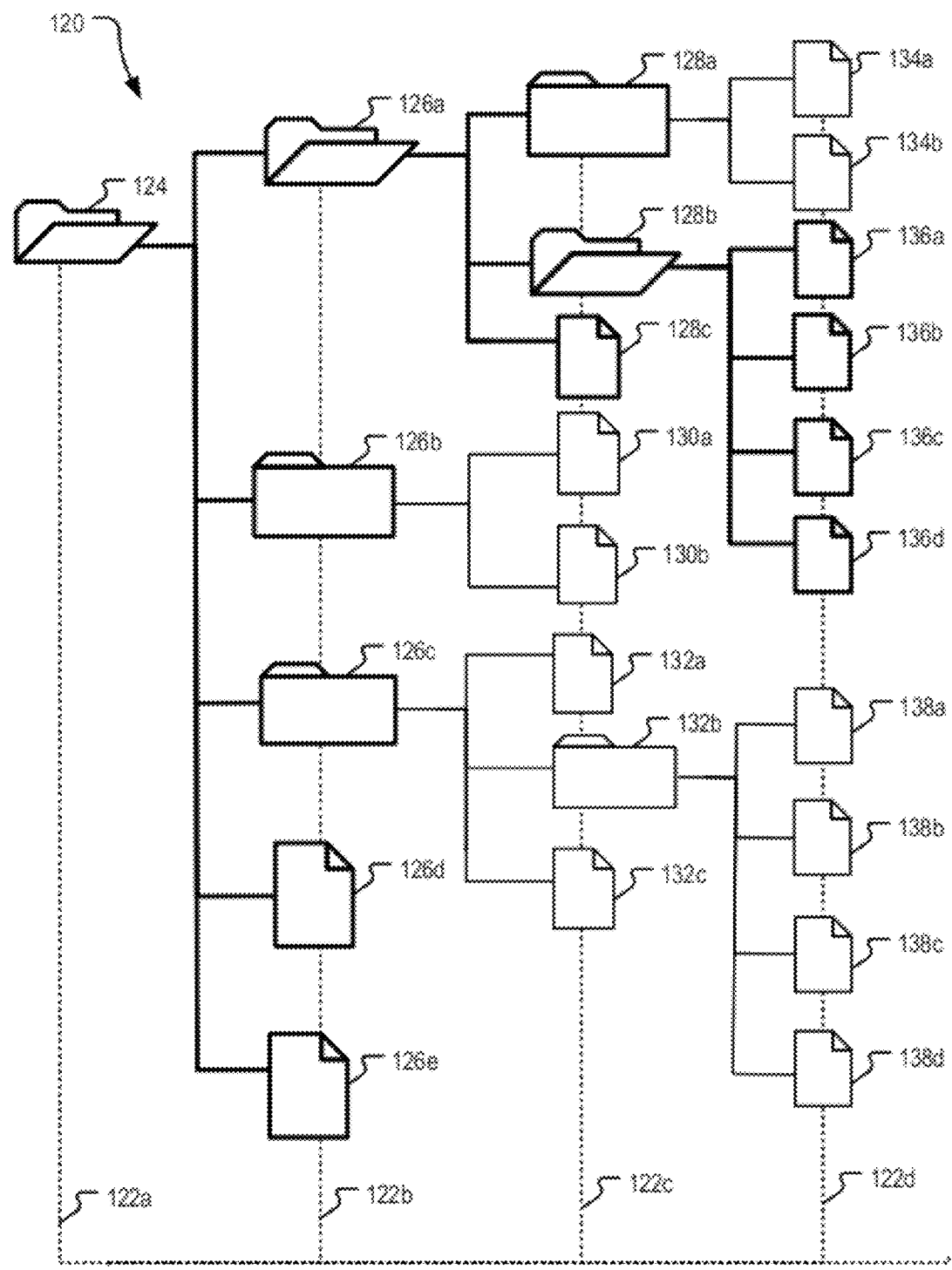
FIG. 1B illustrate a 2D tree-shaped representation of a file system hierarchy.

FIG. 1B illustrates an exemplary tree-shaped representation 120 of the file system hierarchy. In the exemplary tree-shaped representation 120, the file system hierarchy only includes four levels (e.g., levels 122*a-d*), and each level only includes a small number of items. In a more realistic file system, the tree-shaped representation can include many more levels, and each level may include many more items.

In the tree-shaped representation 120, a root level item 124 is shown at the top level or the first level (e.g., the level 122a) of the tree-shape representation 120. The root level item 124 can represent a root directory of a storage disk, for example. A number of items (e.g., items 126a-e) descend from the root level item 124 and are located on the second level (e.g., the level 122b) of the tree-shaped representation 102. The items 126a-e can represent folders (e.g., items 126a-c) and files (e.g., items 126d-e) that are included in the root directory of the storage disk, for example. The items 126a-e are children items of the root level item 124, and the root level item 124 is the parent item of the items 126a-e.

Some of the items (e.g., the items 126a-c) on the second level of the tree-shaped representation 120 can each have one or more child items descending from the second level item (e.g., each of the items 126a-c). For example, the item 126a has three child items (e.g., the items 128a-c) descending from it. The item 126b has two child items (e.g., the items 130a-b) descending from it. The item 126c has three child items (e.g., the items 132a-c) descending from it. Some of the items (e.g., the items 126d-e) on the second level of the tree-shaped representation 120 do not have any child items.

For the items (e.g., the items 126a-c) that do have child items descending from them, the child items can form a third level (e.g., the level 122c) of the tree-shaped representation 120. In this example, the third level of the tree-shaped representation 120 includes three collections of child items: a first collection of child items are child items of the item 126a, a second collection of child items are child items of the item 126b, and a third collection of child items are child items of the item 126c. Each collection of child items in the third level of the hierarchy represents the content items included in a corresponding folder represented by a respective parent item in the second level of the hierarchy.

Some items in the three collections of child items on the third level of the tree-shaped representation 120 may further have child items descending from the third level item. The child items (e.g., items 134a-b, 136a-d, and 138a-d) that descend from the third level items (e.g., items 128a-b, and 132b) can form the fourth level (e.g., the level 122d) of the tree-shaped representation 120.

As illustrated in the exemplary tree-shaped representation 120 of the file system hierarchy, each collection of child items that has the same parent item can form a respective group. Each group descends from a root level item (e.g., item 124) through a respective ancestor item on each level of the tree-shaped representation 120 until the parent item of the group is reached.

For example, for the group of items 134a-b, the ancestor items of the group include the root level item 124, the second level item 126a, and the third level item 128a. Similarly, for the group of items 136a-d, the ancestor items include the root level item 124, the second level item 126a, and the third level item 128b. Similarly, for the group of items 138a-d, the ancestor items include the root level item 124, the second level item 126c, and the third level item 132b. Groups on other levels of the hierarchy can also have ancestor items. For example, the group of items 130a-c has ancestor items 124 on the root level, and 126b on the second level of the tree-shaped representation.

In some implementations, when the tree-shaped representation 120 is presented on the desktop to facilitate the navigation of the file system hierarchy, the tree-shaped representation 120 can be presented in a collapsed form. For example, only the root level nodes can be shown initially, and the user can successively expand the root level node and child nodes that descend along different branches of the tree-shaped representation 120.

For example, the user can open and expand the root level item (e.g., the item 124) to reveal the second level child items (e.g., the items 126a-e) of the root level item (e.g., the item 124). The user can then select and expand a second level child item (e.g., the item 126a) to reveal the third level child items (e.g., the items 128a-c), while the other branches (e.g., the branches including the items 130a-b, 132a-c, and 138a-d) of the tree-shaped representation 120 remain collapsed and their content remain hidden. Once the third level child items (e.g., the items 128a-c) are revealed, the user can further select and expand a third level item (e.g., the item 128b) to reveal the fourth level child items (the items 136a-d) of the selected third level item (e.g., the item 128b). At the end of the above navigation and selection, the items highlighted (e.g., bolded items) in FIG. 1B can be revealed in the tree-shaped representation 120, while the items not highlighted are hidden from view. The user can continue to explore the file system hierarchy by expanding different branches of the tree-shaped representation 120 in a similar manner as above.

Although the tree-shaped representation 120 can provide a complete view of the file system hierarchy and a user can navigate the tree-shaped representation 120 to arrive at any item within the file system hierarchy, the navigation relies on the user's knowledge of the names or icons that are used to represents the different items in tree-shaped representation 120. When the file system becomes large or when the user is not familiar with the content and structure of the file system hierarchy, the navigation within the tree-shaped representation 120 can become cumbersome and difficult. Because the tree-shaped representation 120 offers little visual cue as to the content or identity of each nodes in the tree-shaped representation, the user can easily get lost in the tree-shaped representation 120, and spend much time opening files and folders in search of the item of interest.

In this specification, a 3D space is used to present the items within a file system hierarchy. Each collection of child items that have a common parent item can be presented in a respective browsable parade in the 3D space. Each parade can be associated with a respective depth along a depth dimension into the 3D space, where the depth is correlated with the associated level of the items in the parade within the file system hierarchy. The browsable parade of child items that descend from a currently selected parent item can be presented at the front of the viewable region of the 3D space. The user can browse the parade along a lateral dimension of the 3D space to review each item within the parade.

When the 3D space is presented from a raised viewing angle, one or more additional parades that include the ancestor items of the child items in the front parade can be revealed from behind the front parade at increasing depths into the 3D space. The user can also browse up and down the file system hierarchy by moving the rows of browsable parades associated with different levels of the hierarchy forward and backward along the depth dimension of the 3D space. The user can also switch to a different branch of the file system hierarchy by browsing one of the additional parades behind the front parade along the lateral dimension of the 3D space.

FIGS. 1C-1H are exemplary user interfaces showing the navigation within a browsable parade of items as well as the navigation up and down the file system hierarchy in the 3D space. For illustrating purposes, the starting folder of interest is the folder 128*b* in the tree-shaped representation 120 shown in FIG. 1B.

Figure 1C:
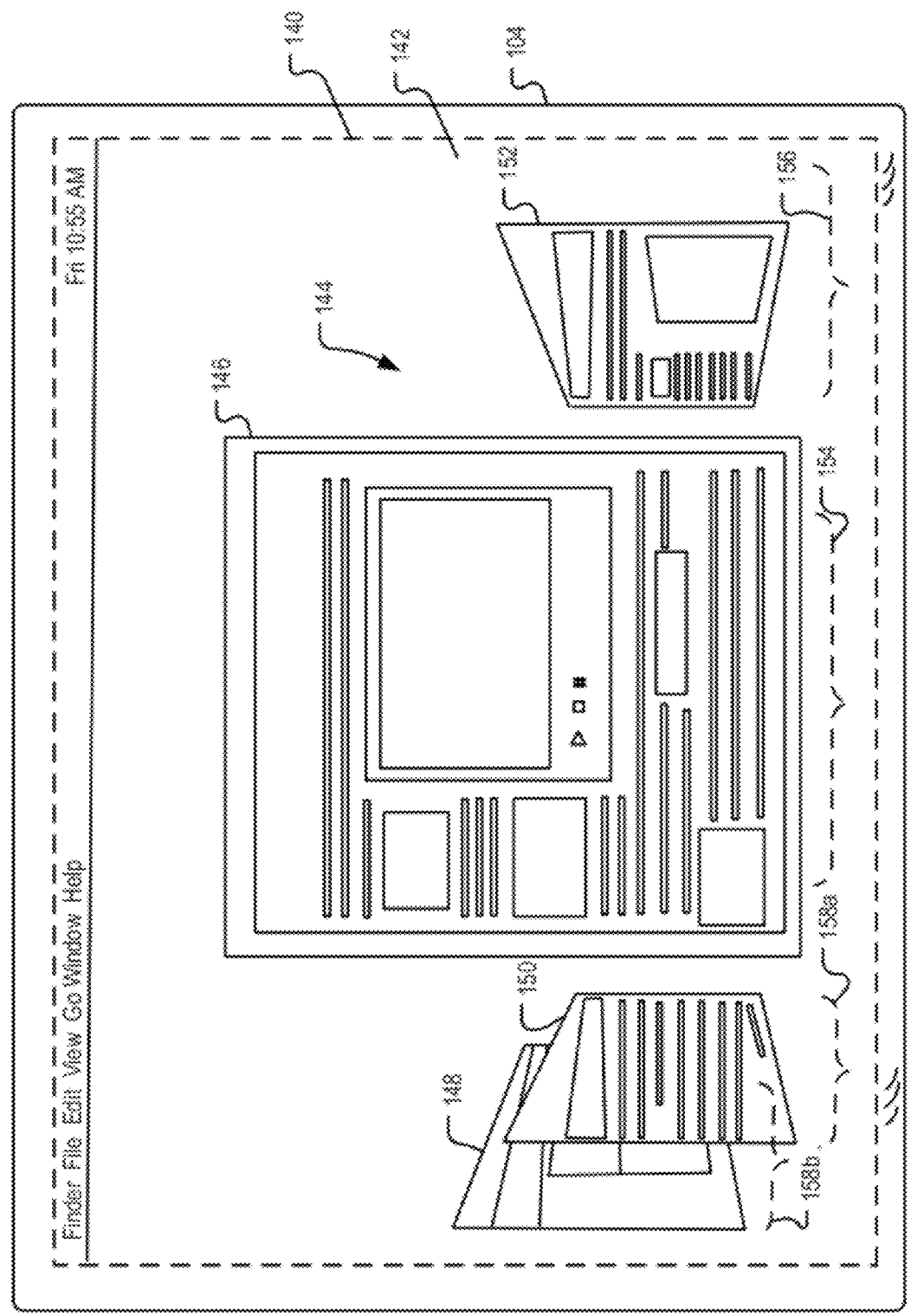
FIG. 1C illustrates an exemplary 3D space showing a browsable parade of items in a first viewing mode.

FIG. 1C illustrates an exemplary 3D space 142 showing a browsable parade of items in a first viewing mode. In the first viewing mode, a collection of child items (e.g., the items 136*a-d* shown in FIG. 1B) that have the same parent item (e.g., the item 128*b* shown in FIG. 1B) are presented in a 3D browsable parade 144 in the 3D space 142 depicted in the display 104. In FIG. 1C, the collection of child items in the browsable parade are represented by respective graphical objects (e.g., object 146, 148, 150, and 152), each respective graphical object contains visual cues for the content and identity of the item the object represents.

In some implementations, each of the graphical objects (e.g, objects 146, 148, 150, and 152) in the browsable parade 144 shows a preview of the item the graphical object represents. For example, if the item is a music file, the graphical object representing the item in the browsable parade 144 can be an image (e.g., an album cover) associated with the music file. For another example, if the item is a shortcut to an application program, the graphical object representing the item in the browsable parade 144 can be an enlarged icon of the application program. For another example, if the item is a text document, the graphical object representing the item in the browsable parade 144 can be a preview of the content of the text document. Other information and/or visual cues can also be embedded in the graphical representation of the items in the browsable parade, such that a user can use the information and/or visual cues to recognize the item represented by the graphical object, and quickly determine whether the item is of interest to the user without having to open the item.

In some implementations, if an item within the browsable parade 144 is a folder containing additional items, the graphical object representing the item can depict a folder to indicate that the item contain additional child items and can be explored further. In some implementations, the graphical object representing a folder can also show small thumbnail images on the surface of the graphical objects to indicate the content of the folder. The user can use the thumbnail images to determine whether the folder may contain items of interest.

In the description of the user interfaces, the graphical object representing an item are used interchangeably as the item the graphical object represents. For example, the graphical objects 146, 148, 150, and 152 can also be referred to as the items 146, 148, 150, and 152.

In some implementations, the 3D browsable parade 144 is associated with a series of locations along a lateral dimension (e.g., in the horizontal direction across the display screen) across the 3D space. The 3D browsable parade 144 can advance through the series of locations under the user's direction.

The series of locations can include a designated primary location, preferably in a central area of the 3D space at a given depth into the 3D space. The designated primary location can be preceded by one or more secondary locations on one side (e.g., left of the designated primary location), and succeeded by one or more secondary locations on the other side (e.g., right of the designated primary location) The user can enter a browsing input (e.g., using an arrow key on the keyboard, or using a directional gesture on a touch-sensitive surface, etc.) to indicate a desired direction in which the browsable parade should progress through the series of locations in the 3D space.

In the first view mode, the series of locations associated with the browsable parade 144 is located near the front of the viewable region in the 3D space along the lateral dimension of the 3D space. In the first view mode, the viewing angle is small relative to a ground plane on which the items in the parade 144 are standing. Therefore, only the browsable parade 144 is prominently visible in the viewable region of the 3D space.

As shown in FIG. 1C, the 3D browsable parade 144 includes a collection of child items (e.g., the items 146, 148, 150, and 152) that descend from a currently selected parent item in the file system hierarchy. The user can invoke the first view mode from a regular 2D desktop. For example, the user can select the parent item 128*b* from the tree-shaped representation 120 shown in FIG. 1B or select an open window showing the collection of items 136*a-d*. After the selection, the user can invoke the first view mode of the 3D space 142 through a predetermined input command, such as a particular key combination or gesture on a touch-sensitive input surface.

When the user interface switches from the 2D desktop to the 3D desktop 140 showing the 3D space 142, the child items of the currently selected parent item can be organized into the 3D browsable parade 144 and presented within the viewable region of the 3D space 142 on the display 104.

As shown in FIG. 1C, the 3D space 142 can include a ground plane on which the items in the 3D parade 144 can stand. The ground plane can extend horizontally across and into the 3D space 142. The ground plane can provide a common baseline for neatly organizing the items in the 3D space 142. In some implementations, the series of locations (e.g., primary location 154, and secondary locations 156, and 158*a-b*) that the browsable parade 144 can advance through can be a slightly curved path coming toward the front of the screen from the left, and after passing the center of the screen, the slightly curved path can recede toward the back of the screen to the right.

In some implementations, the items in the parade 144 do not necessarily stand on the same ground plane, and do not necessarily follow the curved path as described above. Other configurations of the ground plane and/or path for the browsable parade 144 are possible. For example, a zigzagged or slightly hilly ground plane or a straight or serpentine path for the browsable parade can also be implemented. However, in general, the browsable parade 144 advances laterally across the 3D space 142 in a generally horizontal direction as seen by a user on the display screen 104. As used herein, the series of locations or path that are associated with each browsable parade can be confined in a row or segment of space that is associated with a respective depth or depth range along the depth dimension of the 3D space.

In some implementations, the item (e.g., the item 146) at the primary location 154 can be presented in a frontal, and optionally enlarged view. For example, the item in the primary location (e.g., item 146) can have a height occupying about 70% of the screen height. In some implementations, the user is allowed to specify a preferred size for the item occupying the designated primary location (e.g., primary location 154). The enlarged size of the item in the primary location can allow the user to preview the content of the item with ease.

In some implementations, user interface elements can be presented that allows the user to interact with the item without opening the item in an application window. For example, if the item at the primary location is a music or video file, user interface elements for playing the music or video file can be presented, so that the user can use the user interface elements to play and review the music or video file.

In some implementations, the items (e.g., the items 148, 150, and 152) shown in the secondary locations (e.g., the secondary locations 158a-b) on the left side of the 3D space 142 can be rotated by an angle about a respective axis normal to the ground plane, such that each item becomes partially obscured by an immediate preceding item. For example, the item 150 precedes the item 148 in the 3D browsable parade 144, and the item 148 can be partially obscured by the item 150.

Similarly, the items (e.g., the item 152) in the secondary locations (e.g., the secondary location 156) can also be rotated by an angle about a respective axis normal to the ground plane. Each item can become partially obscured by an immediate succeeding item. However, in this example, since only one item is shown on the right side of the 3D space 142, no obscuration is occurring. By rotating the items in the secondary locations, more items can be displayed within the limited space occupied by the secondary locations in the 3D space 134.

In some implementations, the spacing between adjacent items in the secondary locations can be enlarged or reduced to adjust the amount of obscuration that is occurring between adjacent items. For example, when the spacing between adjacent secondary locations is increased, the amount of obscuration made on an item by an adjacent item can be decreased. When the spacing between adjacent secondary locations is decreased, the amount of obscuration made on an item by an adjacent item can be increased. In some implementations, the spacing can be automatically adjusted depending on the number of items that are displayed in the browsable parade 144.

In some implementations, the sizes of the graphical representations for the items presented in the secondary locations (e.g., the secondary locations 158a-b and 156) can be significantly smaller than the graphical representation for the item presented at the primary location, such that a large number of items can fit within the limited space occupied by the secondary locations. However, the appearance of the graphical representations in the secondary location can still provide visual cues for the content and identity of the items they represent.

In some implementations (e.g., when an extended screen is available), the sizes of the items presented in the secondary locations need not be significantly shrunken as compared to the item shown at the primary location. The open windows in the secondary locations can simply be rotated by an angle such that all items in the browsable parade can fit within the display space.

In some implementations, the order of the items within the browsable parade can be based on an order of the items resulted from sorting the items according to a particular sorting criterion. Examples of the sorting criterion can include modification time, owners, file type, item name, and so on. As the browsable parade 144 advances through the series of locations associated with the browsable parade 144, each item in the browsable parade can enter the primary location in the order that is resulted from sorting the items according to the sorting criterion.

When the user browses from left to right within the browsable parade 144, each item can move toward the right of the screen by one location at a time. For example, the item 148 can advance to the location of the item 150, and the item 150 can in turn advance toward the primary location 154. When the item 150 reaches the primary location 154, the item 150 can rotate to face the front of the display, and optionally become enlarged. The previous item (e.g., the item 146) occupying the primary location 154 can advance into the secondary location 156. As the previous item (e.g., the item 146) occupying the primary location 154 reaches the secondary location on the right, the previous item can be rotated to face toward the primary location 154, and optionally shrunken in size to match the sizes of other items in the secondary locations. The rightmost item (e.g., the item 152) can be moved further to a newly created secondary location on the right end of the 3D space 142.

Figure 1D:
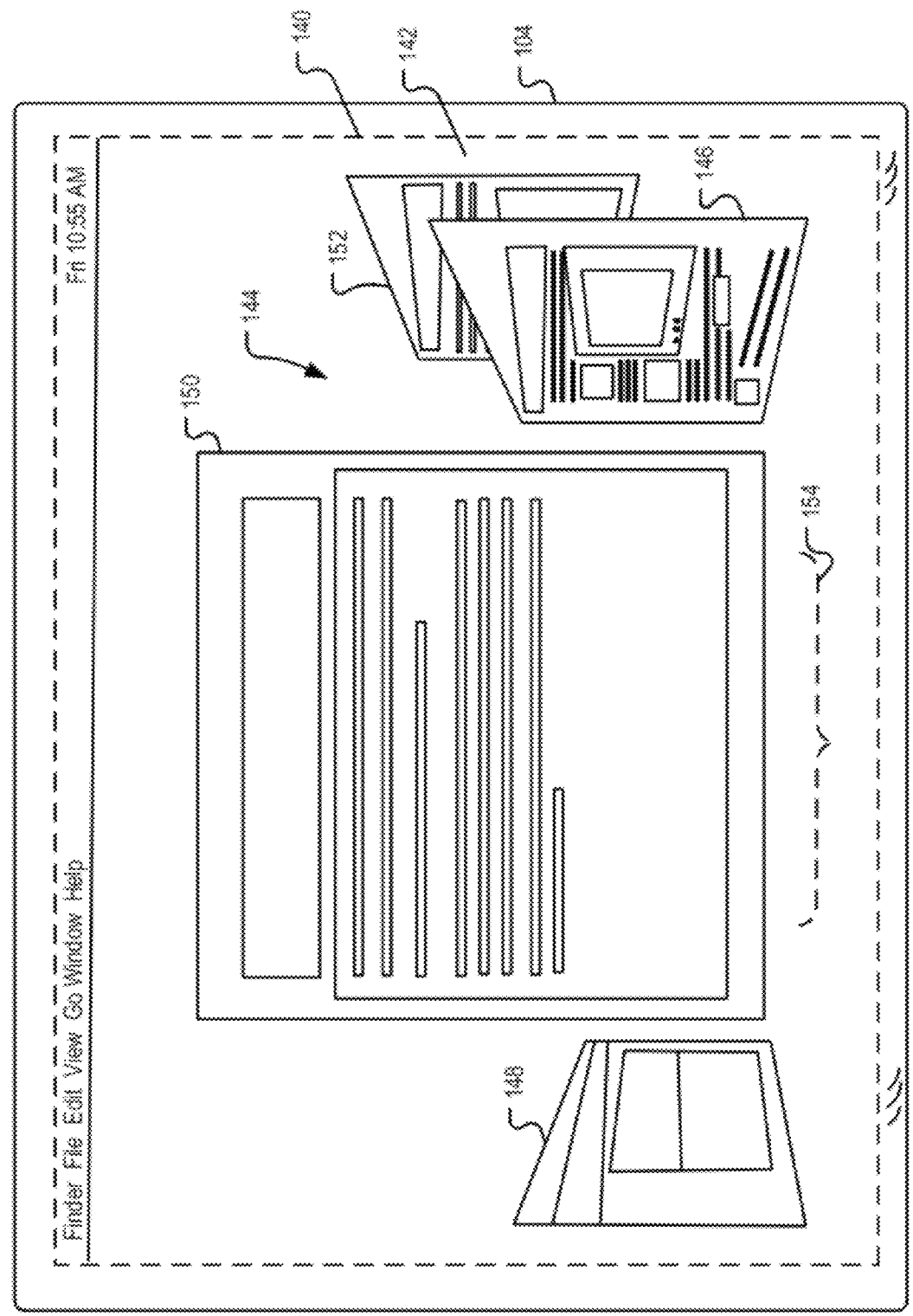
FIG. 1D is an exemplary diagram illustrating the browsing of the browsable parade across a lateral dimension of the 3D space in the first view mode.

FIG. 1D illustrates the result of browsing the 3D browsable parade 144 laterally across the 3D space 142 toward the right of the display screen 104. In FIG. 1D, the 3D browsable parade 144 has advanced by one location toward the right of the 3D space 142. The item 150 has now entered in the primary location (e.g., the primary location 154) of the 3D space 144, while the items 148, 152, and 146 occupy the secondary locations of the 3D space 142.

In some implementations, instead of browsing through the items in the browsable parade 144 one by one in a user-specified direction, the user can also directly select an item shown in a secondary location of the 3D space 144. For example, the user can select the item 152 shown in FIG. 1D, and the entire parade 144 can shift to the left until the selected item 152 enters the primary location 154. In some implementations, the selected item can trade places with the item that is currently occupying the primary location 154.

In some implementations, visual effects showing the items transitioning from a secondary location into the primary location, and from the primary location back to the secondary location can be implemented. The visual effects can mimic the appearance of the items being paraded in front of an audience.

As shown in FIGS. 1C and 1D, in the first viewing mode, only one browsable parade 144 is presented in the 3D space 144. The browsable parade 144 includes a collection of child items that descend from a currently selected parent item. In the first viewing mode, the browsable parade 144 is presented at the front of the viewable region of the 3D space 142, and items within other parts of the file system hierarchy are not visible in the 3D space 142. In some implementations, some indication of the items from higher levels of the hierarchy above the collection of child items in the parade 144 can be presented in the viewable region of the 3D space. The indication can be provided merely to show that the collection of child items belong to a larger hierarchy, and details of the other levels of the hierarchy can be obscured when the other levels of the hierarchy are presented in the first viewing mode.

In some implementations, when the user wishes to explore the file system hierarchy within the 3D space, the user can choose to raise the viewing angle of the 3D space 142 (e.g., along a height dimension of the 3D space 142) to enter a second viewing mode. In the second viewing mode, one or more additional browsable parades for higher-level items above the items in the front parade 144 can be revealed from behind the front parade 144. Each of the additional parades can include a respective collection of child items that descend from a common parent item. In addition, each of the additional parade is associated with a respective level and includes an ancestor item of the items in the front parade 144 from the respective level.

Each of the additional parades is also associated with a respective series of locations through which the additional parade can advance in a direction along the lateral dimension of the 3D space 142. Each respective series of locations occupies a row or space segment at a particular depth or within a particular depth range along the depth dimension into the 3D space 142. Each series of locations can include a primary location (e.g., in the central region of the display) and one or more secondary locations preceding and succeeding the primary location along the lateral dimension of the 3D space 142.

Figure 1E:
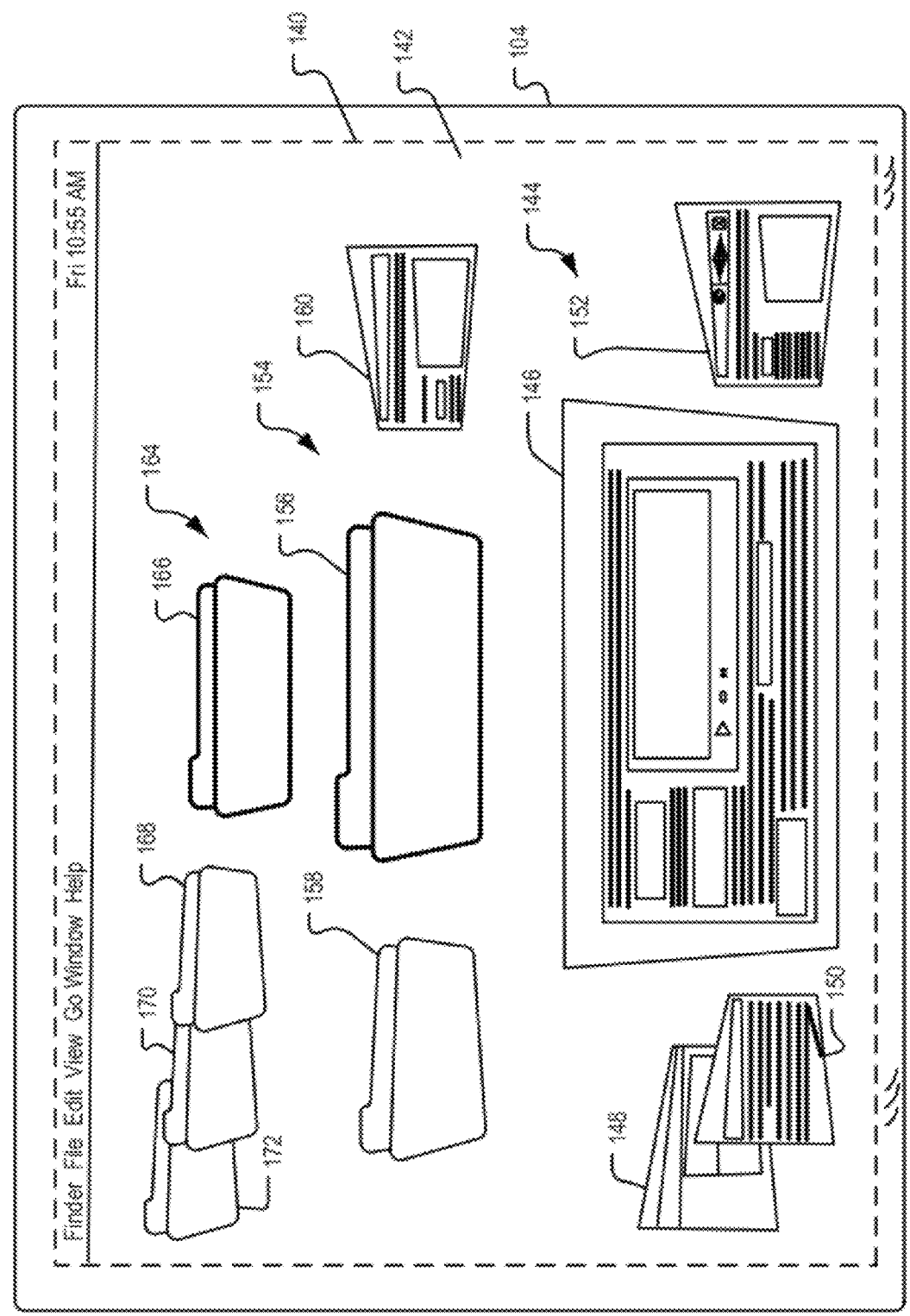
FIG. 1E illustrates an exemplary 3D space showing respective browsable parades containing items from multiple levels of the file system hierarchy in a second viewing mode.

As shown in FIG. 1E, the 3D space 142 is presented in the second viewing mode. The current configuration of items shown in FIG. 1E can result when the user interface 140 is transitioned from the first viewing mode shown in FIG. 1C to the second viewing mode. The front parade 144 containing the child items of a currently selected parent item (e.g., the item 156) is viewed from a raised viewing angle. From behind the front parade 144, two additional parades 154 and 164 can be presented. In some implementations, more or fewer additional parades can be presented depending on the amount of viewable space that is available on the display 104.

Each of the two additional parades (e.g., the first additional parade 154 and the second additional parade 164) is associated with a respective level of the file system hierarchy. The first additional parade 154 behind the front parade 144 is associated with a level of the hierarchy that contains the parent item (e.g., the item 156) of the items (e.g., the items 146, 148, 150, and 152) in the front parade 144. Therefore, the first additional parade 154 can also be called the parent parade of the front parade 144. In addition to the currently selected parent item (e.g., the item 156), the first additional parade 154 can also include other items that descend from a common parent item as the currently selected parent item (e.g., the item 156).

The second additional parade 164 behind the first additional parade 154 is associated with a level of the hierarchy that contains the parent item (e.g., the item 166) of the items (e.g., the items 156, 158, and 160) in the parent parade 154. The second additional parade can also include other items that descend from a common parent item as the currently selected parent item 156.

In some implementations, depending on the vertical space available on the display screen 104, additional rows of browsable parades can be made visible in the viewable region of the 3D space 142. Each additional row of browsable parade can be associated with a respective level of the hierarchy that includes an ancestor item of the child items shown in the front parade 144. Each additional row of browsable parade can be displayed at a corresponding depth into the 3D space, where a root level of the hierarchy is associated with a largest depth into the 3D space, while a lowest level of the hierarchy is associated with the smallest depth into the 3D space.

Depending on the level of the hierarchy that the child items of a currently selected parent item occupies, the starting viewing position along the depth dimension (e.g., the front of the viewable region of the 3D space) can be shifted such that the parade for the child items of a currently selected parent item is displayed at the front of the viewable region in the 3D space 142.

In some implementations, the ancestor item (e.g., the items 156 and 166) in each of the additional parades that are revealed from behind the front parade 144 can be highlighted to indicate their relationship to the collection of child items in the front parade 144. For example, the items 156 and 166 are ancestor items of the items 146, 148, 150, and 152 in the front parade 144, and the items 156 and 166 are highlighted to indicate their status as the ancestor items for the items in the front parade 144. In addition, in some implementations, the ancestor items of the child items in the front parade 144 can be presented at the designated primary locations at various depths into the 3D space 142. For example, the designated primary locations can be located in a central region along the lateral dimension of the 3D space, and at various depths into the 3D space, where the various depths are associated with different levels of the hierarchy.

In some implementations, when an ancestor item is presented in the primary location at a corresponding depth into the 3D space, the ancestor item can be presented in a frontal view, and optionally enlarged as compared to other items in the same parade. For example, the ancestor items 156 and 166 presented at the designated primary locations in the first and second row behind the front parade 144 can be presented in a frontal, and optionally enlarged view, while the other items (e.g., items 158, 160, 168, 170, and 172) can be presented in an oblique and optionally diminished view as compared to the ancestor item in the same parade.

Within the second viewing mode, the additional parades that are revealed from behind the front parade 144 can serve to provide context to the child items in the front parade 144 relative to the file system hierarchy. In addition, only a portion of the file system hierarchy is made visible in the viewable region of the 3D space at a time. The graphical representations of the items in the front and the additional parades can include sufficient amount of detail to provide visual cues to the user about the content and the identity of the items in the parades, so that the user viewing the graphical representations in the parades can easily determine whether an item being reviewed is an item of interest.

In the second viewing mode, not only is the front parade 144 browsable along the lateral dimension of the 3D space 142 (e.g., left to right, or right to left), the additional parades revealed from behind the front parade 144 can also be browsable along the lateral dimension of the 3D space. For example, the user can enter a browsing command directed toward one of the additional parades presented behind the front parade 144. The browsing command can indicate a direction along the lateral dimension of the 3D space in which the user wishes to have the browsable parade advance. In response to the browsing command, the browsable parade can advance laterally through the series of locations associated with the browsable parade in the direction indicated by the user.

Figure 1F:
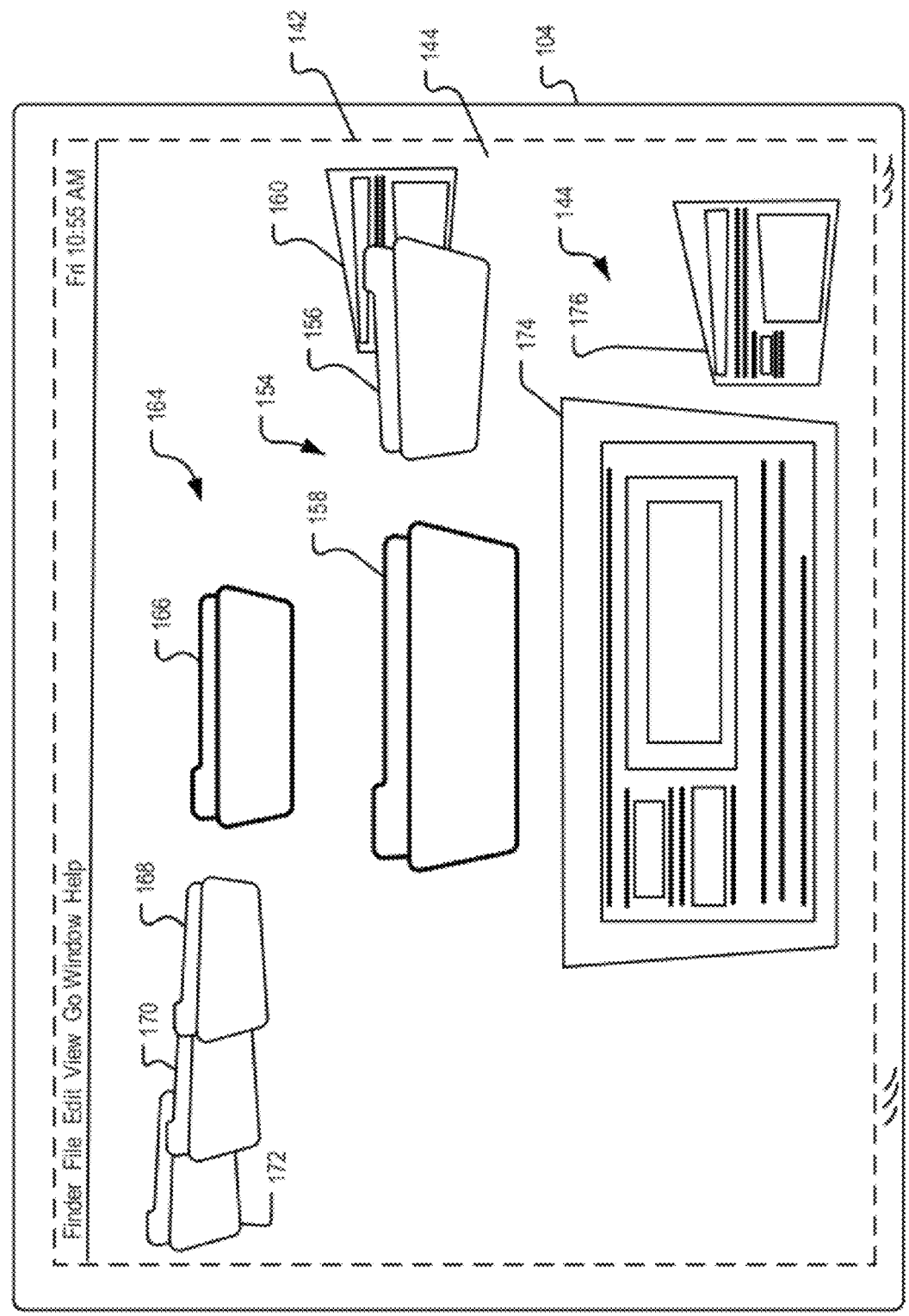
FIG. 1F is an exemplary diagram illustrating the browsing within a parent-level parade in the second view mode.

For example, FIG. 1F illustrates the result of browsing one of the additional 3D browsable parades along the lateral dimension across the 3D space while in the second viewing mode. In FIG. 1F, the user has interacted with the first additional parade (e.g., the parent parade 154 shown in FIG. 1E) behind the front parade 144, and entered a browsing command causing the first additional parade to advance to the right of the display screen 104. In response to the browsing command, the items in the first additional parade 154 shift their locations to the right one by one.

As shown in FIG. 1F, the previously selected parent item (e.g., the item 156) shown in the parent parade 154 has advanced past the primary location at the center of the 3D space 142 in the row associated with the first additional parade 154, and another item (e.g., the item 158) has entered the primary location. When a parent item (e.g., the item 156) in the first additional parade 154 behind the front parade 144 exits the primary location and enters a secondary location of the 3D space, the parent item is no longer the currently selected parent item. The next item (e.g., the item 158) in the first additional parade 154 behind the front parade 144 enters from a secondary location into the primary location of the 3D space. The next item (e.g., the item 158) currently occupying the primary location becomes the currently selected parent item, and the child items shown in the front parade 144 can be updated to show the child items of the currently selected parent item (e.g., the item 158).

For example, as shown in FIG. 1F, because of the browsing, the item 158 has entered the primary location of the 3D space in a row behind the front parade 144. The item 158 has become the currently selected parent item. As a result, the front parade 144 has been updated to show the child items (e.g., the items 174 and 176) of the currently selected parent item 158. As the user continue to browse through the parent items in the first additional parade behind the front parade, the front parade can be continually updated to show the child items of the parent item that is currently occupying the primary location in the row behind the front parade.

In some implementations, if the item entering the primary location in the row behind the front parade does not have any child items, then the entire parade containing the item can be brought forward toward the front of the viewable region of the 3D space 142, and presented at the front of the viewable region of the 3D space. An additional level of the hierarchy above the level associated with the second additional parade 164 can be brought into view in the viewable region of the 3D space.

In some implementations, in addition to browsing the currently visible parades along the lateral dimension across the 3D space at various depths into the 3D space, the user can also select one of the parent items in the parent parade directly. Upon selection, the selected parent item can be moved to the primary location associated with the parent parade, and the front parade can be updated to show the child items of the selected parent item.

In some implementations, the user can also browse up and down the file system hierarchy along the depth dimension of the 3D space while in the second viewing mode.

For example, as shown in FIG. 1F, the user can browse up the hierarchy, for example, by entering a scrolling command. The scrolling command can indicate a direction going up the hierarchy. In response to the scroll command, the rows of additional parades behind the front parade can be brought forward towards the front of the viewable region of the 3D space, and the front parade can be pushed out of view from the front of the viewable region of the 3D space and replaced by the first addition parade behind the previous front parade that is now out of the view. At the same time, additional parades including higher-level items can be brought into the viewable area of the 3D space 142.

Figure 1G:
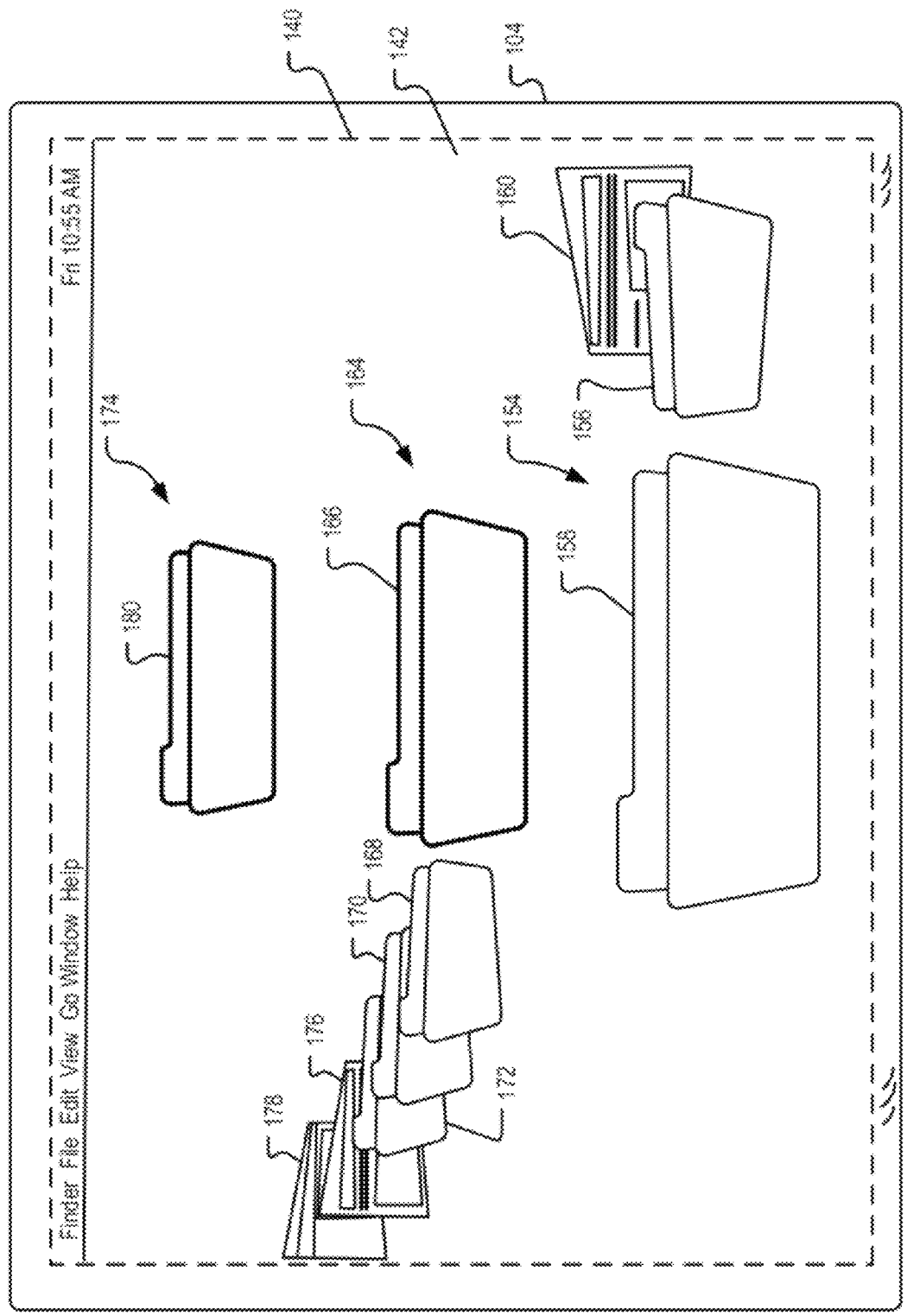
FIG. 1G is an exemplary diagram illustrating the browsing up the file system hierarchy in the second view mode.

For example, FIG. 1G illustrates the result after browsing up the hierarchy by one level from the view shown in FIG. 1F. In FIG. 1G, the previous front parade 144 has been pulled forward out of the front of the viewable area of the 3D space 142. The additional parades that were previously revealed from behind the previous front parade 144 have also been pulled forward toward the front of the viewable area in the 3D space 142. The first additional parade (e.g., the parade 154) behind the previous front parade 144 now occupies the front of the viewable area in the 3D space 142, and the second additional parade (e.g., the parade 164) behind the previous first additional parade (e.g., the parade 154) has now becomes the first additional parade behind the current front parade. One additional parade (e.g., parade 174 containing a root level item 180) at a level above the previous second additional parade (e.g., the parade 164) has entered the viewable area of the 3D space, and become the second additional parade behind the current front parade (e.g., the parade 154). In some implementations, the user can continue to browse up the hierarchy until the root level item enters the front parade of the 3D space 142.

In some implementations, if items in the additional parades that were not previously visible due to space constraints can become visible as a result of the browsing. For example, items 178 and 176 were previously hidden from view due to the space constraints placed on the back row, and when the parade containing the items 178 and 176 is brought forward toward the front of the viewable region of the 3D space, the items 178 and 176 can become visible along with other items in the same parade.

In some implementations, the user can also browse down the hierarchy from the child item occupying the primary location associated with the front parade. In order to browse down the file system hierarchy, the child item occupying the primary location associated with the front parade needs to be a parent item of additional child items at a lower level of the file system hierarchy.

If the item occupying the primary location in the front row of the viewable area in the 3D space does not have any child items, the command for browsing down the hierarchy can be ignored. The user can browse left or right within the front parade, such that an item that does have child items can enter the primary location before the user can browse down the hierarchy.

Alternatively, the user can change the currently selected parent item in the first additional parade behind the front parade, such that a different set of child items are presented in the front parade, and the user can browse down the hierarchy from an item within the new set of items, provided that the item has child items.

Figure 1H:
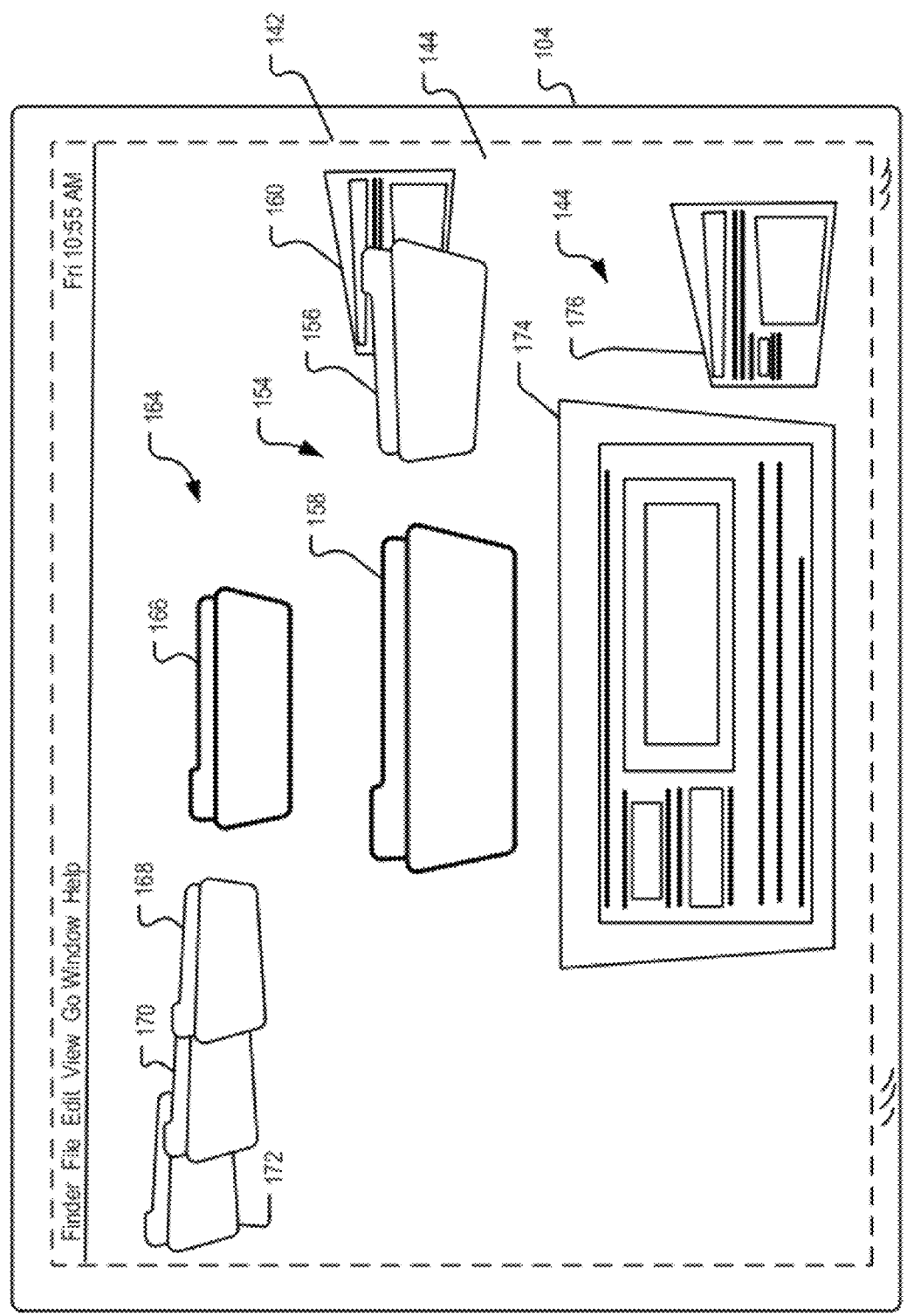
FIG. 1H is an exemplary diagram illustrating the browsing down the file system hierarchy in the second view mode.

FIG. 1H illustrates the result after browsing down the center folder (e.g., the item 158) shown in the front parade (e.g., the parade 154) in FIG. 1G. By browsing down the center folder in the front parade, the front parade can be pushed backward toward the back of the viewable area in the 3D space. Similarly, other additional parades presented behind the front parade are also pushed back toward the back of the viewable area in the 3D space. As a result, the last rows of additional parades can be pushed out of the viewable area in the 3D space as the user continues to browse down the hierarchy. The child items of the item previously occupying the primary location associated with the front parade can be presented in a parade at the front of the viewable area in the 3D space. As shown in this example, the child items of the center folder 158 can be presented in a front parade 144 after the user has browsed down the hierarchy by one level.

The presentation of browsable parades at different depths along a depth dimension into the 3D space allows the user to browse up and down a file system hierarchy intuitively. The ability to browse up and down a hierarchy combined with the ability to browse laterally across one or more parades presented within the viewable area of the 3D space, allows the user to navigate the entire file system hierarchy intuitively and efficiently. In addition, only a small number of parades are present within the viewable area of the 3D space, such that the graphical representations of items in the parades can carry a substantial amount of visual information about the content and identity of the items. The visual information can provide cues for the user to quickly determine whether an item is of interest without opening the item in a window on the desktop.

In some implementations, the 3D user interfaces for organizing a large number of items into successive rows arranged along the depth dimension of the 3D space, and for browsing the successive rows along the depth dimension of the 3D space can be applied to non-hierarchical data items. From a raised viewing angle, a large number of rows can be simultaneously visible within the display screen, and the user can quickly browse through and review a large number of items in the different rows even though the items may be partially obscured by other items in front of them.

Figure 2A:
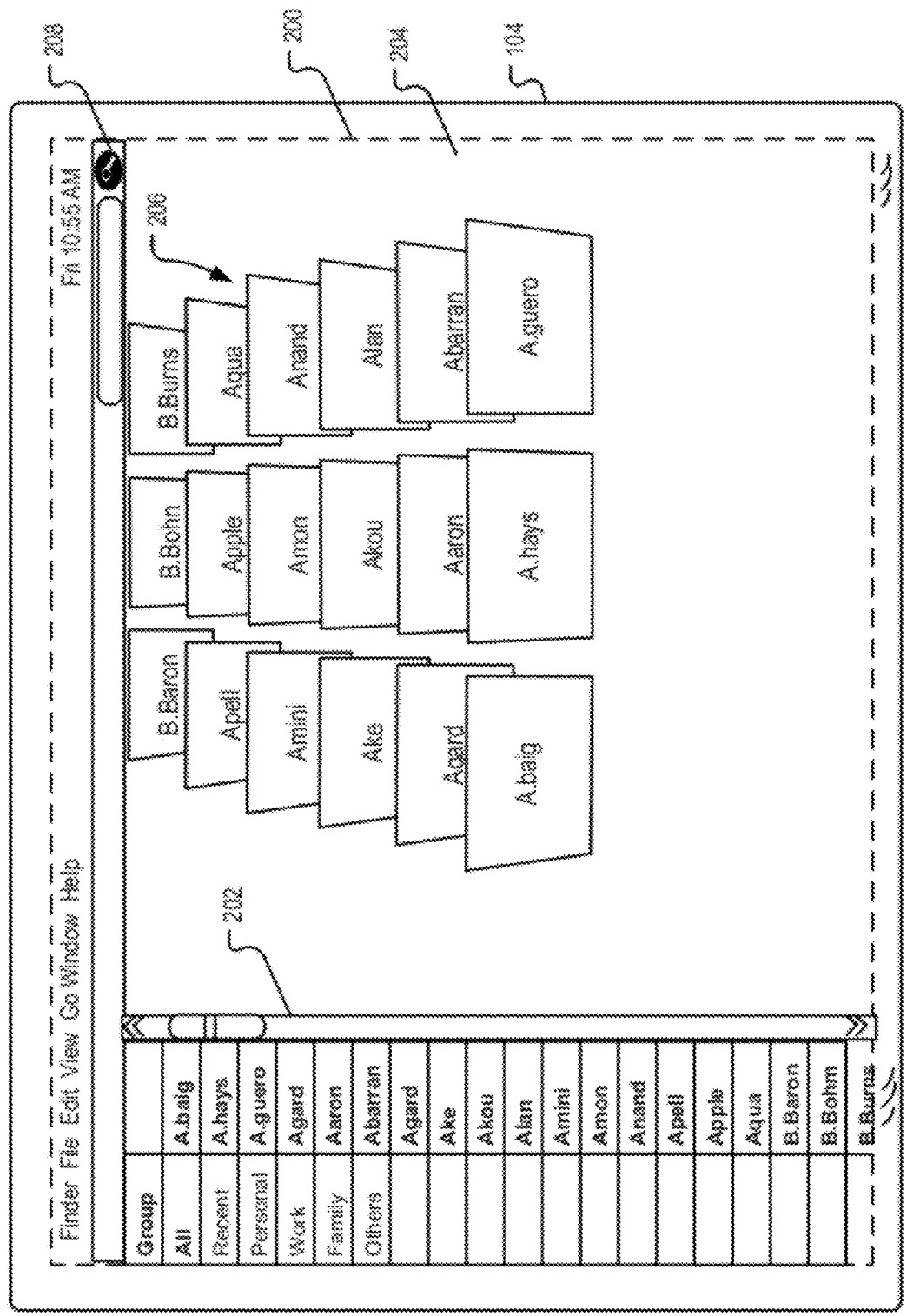
FIG. 2A is an exemplary user interface displaying a plurality of items in multiple rows in a 3D space.

For example, FIG. 2A shows an exemplary user interface 200 for managing contacts in an address book. The records of individual contacts are the items that need to be presented and browsed in this example. In the exemplary user interface 200, a left panel 202 can include a user interface element for selecting a group of contacts for display within an area 204. When the user selects a group from all available groups of contacts (e.g., All, Recent, Personal, Work, Family) in the left panel 202, the records for the selected group of contacts can be presented in the area 204.

In some implementations, if multiple records exist in a selected group, the records can be organized into successive rows 206 arranged along a depth dimension of a 3D space depicted in the area 204. Each row can include a fixed number of records. As shown in the exemplary user interface 200, the currently selected group is "All contacts" stored in the address book. In response to the selection, the records for all contacts in the address book can be organized into successive rows of three records, and presented in the area 204. In some implementations, the records can be depicted as v-cards standing on a ground plane within the 3D space and facing the front of the 3D space. The ground plane extends laterally across the 3D space and into the 3D space.

In some implementations, the 3D space is presented from a viewing angle raised above the ground plane. Therefore, multiple rows of records can be visible (at least partially) within the viewable region of the 3D space on the display screen 104. The rows of records can be scrolled backward and forward along the depth dimension of the 3D space. The user can enter a browsing command that indicates a desired direction for the browsing. The user can also stop or pause the browsing in either direction when a record of interest is detected.

Figure 2B:
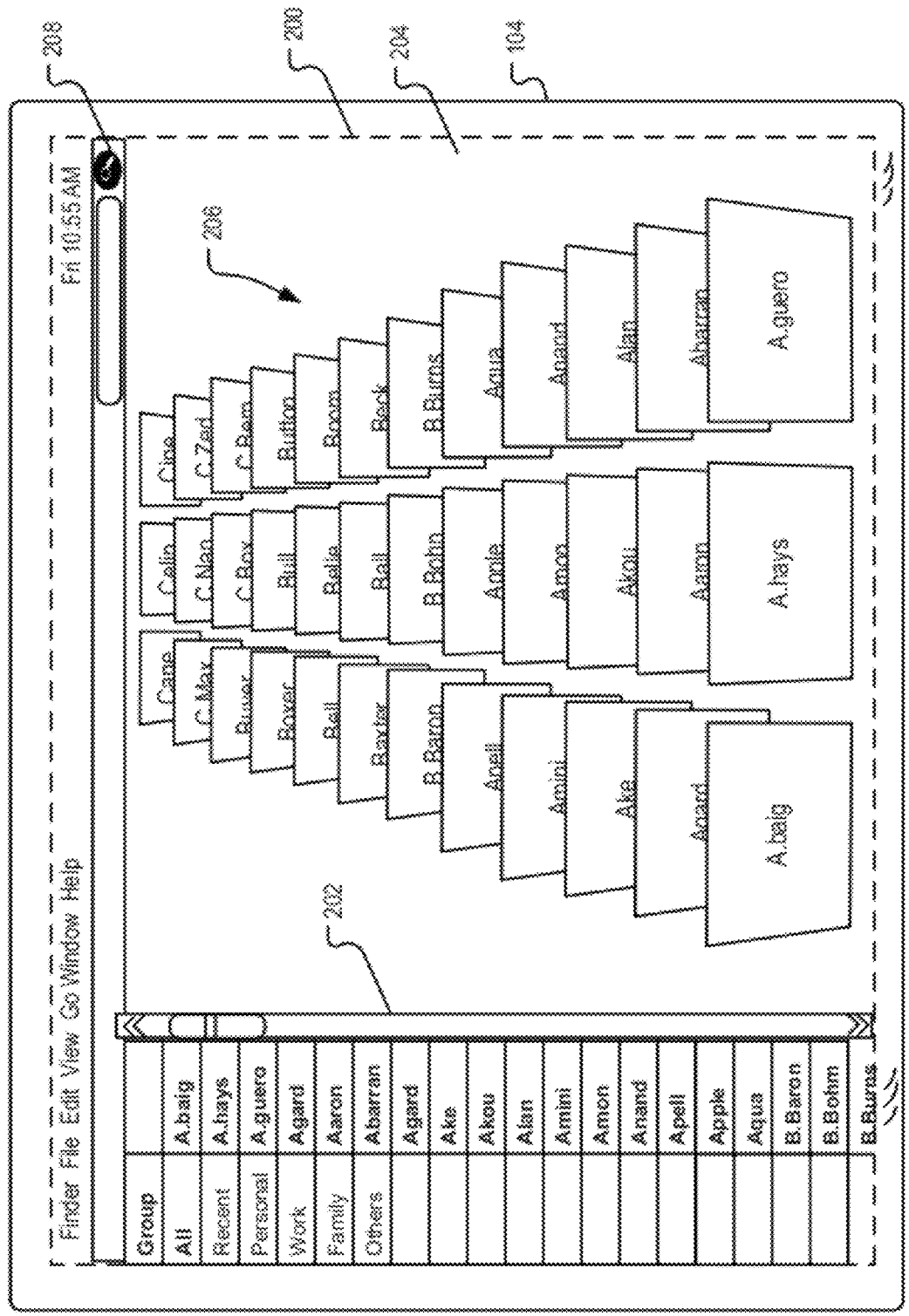
FIG. 2B is an exemplary diagram illustrating the browsing of the plurality of items in a direction along a depth dimension into the 3D space.

For example, as shown in FIG. 2B, when the user browses in a direction toward the front of the viewable region along the depth dimension of the 3D space, the rows of records can continue to enter the viewable region of the 3D space from the back of the 3D space toward the front of the 3D space, and the rows at the front of the visible region can be pushed out of view.

When the user browses in a direction toward the back of the viewable region along the depth dimension into the 3D space, the rows of records are pushed back into the 3D space along the depth dimension. The rows toward the front of the record array 206 can be brought back into the viewable area of the 3D space 204, and the rows toward the back of the record array 206 can be pushed into the 3D space along the depth dimension and out of the viewable area of the 3D space.

In some implementations, the user can raise the viewing angle from which the 3D space is presented. For example, when the viewing angle is small, although the front row is not obscured by any records, the records shown in each row behind the front row can be obscured by other rows in front. When the user enters a command to increase the viewing angle above the ground plane in the 3D space, more area of each record in the later rows can be revealed from behind the rows in front, and less obscuration would occur.

In some implementations, a picture or other labels or indicators can be shown on the records that can help the user to recognize the contacts shown on the records without seeing the full content of the records. For example, if the user can recognize the contact in each record by seeing only a top portion of the record, the user can quickly browse through many rows of records rather than having to wait until each row comes to the front of the 3D space.

In some implementations, the user can adjust the spacing between the rows of records in the array. By decreasing the spacing, more rows of records can be fit within the viewable area of the 3D space, and the user can scan through the rows of records more quickly. If too much obscuration is occurring and it becomes too difficult to recognize the records based on the top portions of the records that are visible, the user can raise the viewing angle to decrease the amount of obscuration that is occurring.

In some implementations, the user can also increase the spacing between records without raising the viewing angle. By increasing the spacing between rows of records, less obscuration would occur and the user can browse through the records while seeing a larger portion of the records that is not obscured by the other rows of records in front.

In some implementations, the user can select a record from the rows of record that are being presented in the 3D space. When the user has made a selection, the array of records can be removed from the area 204, and the selected record can be presented in an enlarged frontal view in the area 204.

In some implementations, the user can select a subset of all records stored in the address book. The selection can be made according to one or more selection criteria. The selection criteria can be entered through various user interface elements presented on the user interface 200. For example, the user can select one of the groups listed in the left panel 202. Each group may include all or only a partial subset of all the contacts in the address book. These groups can be formed before the selection is made.

In some implementations, the user can select a subset of records from a list shown in the left panel 202. For example, when the user has selected a group in the left panel 202, a list of records in the selected group can be presented in the left panel 202 as well. The user can further select one or more records from the list, for example, by highlighting particular records shown in the list. As the user continue to select additional records from the list, the record array 206 shown in the area 204 can grow in size to include the newly selected records.

In some implementations, the user can enter search criteria in a search field 208. The records satisfying the search criteria entered by the user can be located and presented in the area 204. For example, the user can enter a name of a contact, or a company affiliation of a contact, and one or more records may satisfy the search criteria. Once the records satisfying the search criteria are located, the records can be organized into successive rows and presented in the 3D space depicted in the area 204.

In some implementations, if an array of records is already present in the area 204, the existing array can be removed from the 3D space, and the set of records satisfying the search criteria can be presented in a new array in the 3D space.

Although the examples are given in terms of a user interface for managing records of contacts in an address book application, records of other data can also be presented in a similar manner. Examples of records that can be presented include, product inventory, job candidates, documents, and so on.

Exemplary Processes for Presenting and Browsing Items in a 3D Space

FIGS. 3-6B are exemplary processes for presenting and browsing items as described above with respect to FIGS.

1A-2B. The processes can include steps for implementing various aspects of the user interfaces and functionalities described with respect to FIG. 1A-2B. Different combinations and subcombinations of the various aspects are possible.

Figure 3:
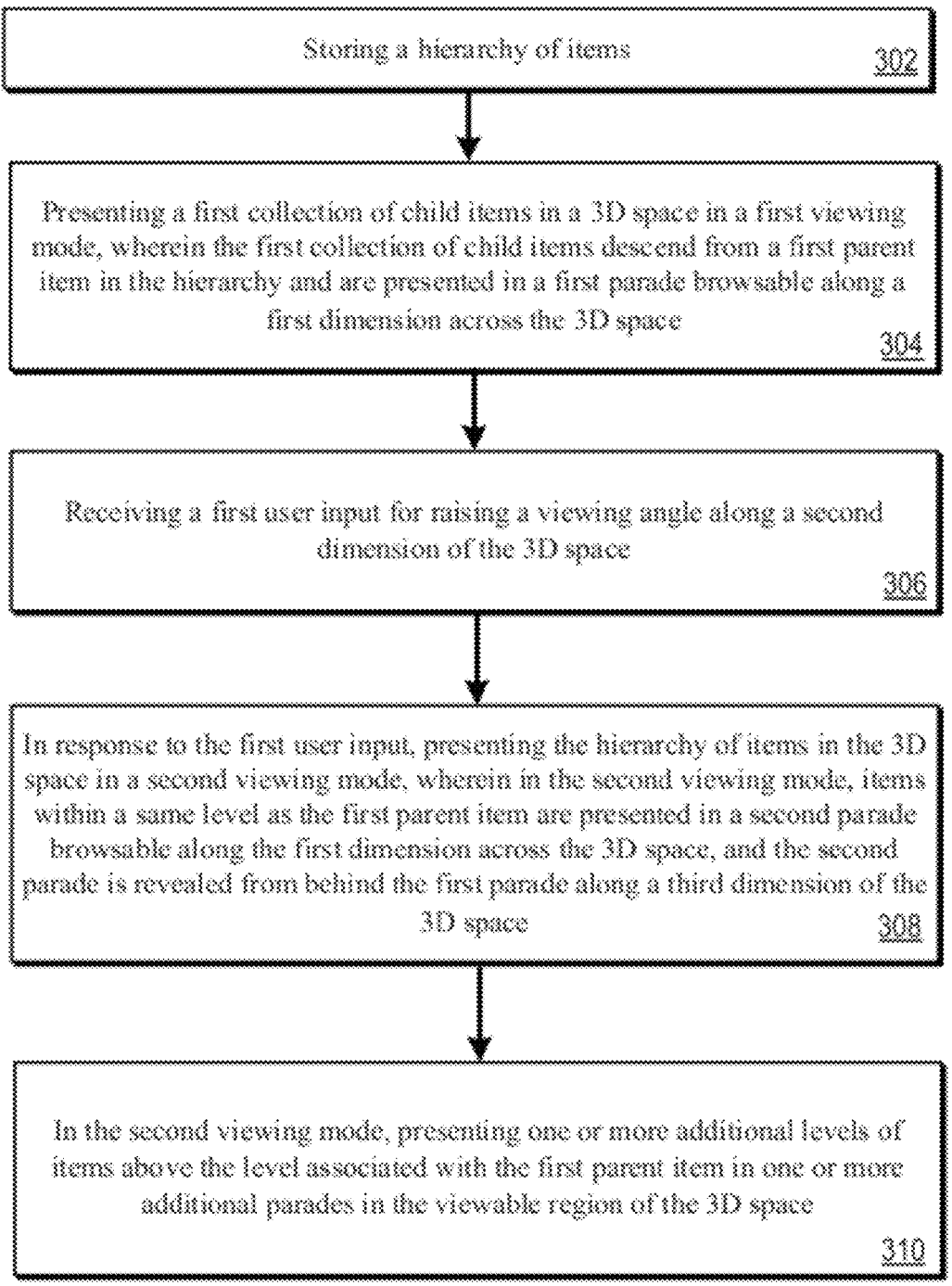
FIG. 3 is a flow diagram of an exemplary process for presenting a hierarchy in a 3D space and transitioning from a first viewing mode to a second viewing mode.

FIG. 3 is a flow diagram of an exemplary process 300 for presenting a hierarchy of items in a 3D space and transitioning from a first viewing mode to a second viewing mode.

In the process 300, a hierarchy of items can be stored (302). The hierarchy can include a plurality of levels. Each item can be either a root level item within a root level of the hierarchy or a child item within a first level of the hierarchy that descends from a respective parent item within another level of the hierarchy above the lower level. A first collection of child items can be presented in a 3D space in a first viewing mode (304), where the first collection of child items descend from a first parent item in the hierarchy and are presented in a first parade browsable along a first dimension (e.g., the lateral dimension) across the 3D space. In the first viewing mode, the first parade can be presented at the front of a viewable region of the 3D space while items from levels above the level associated with the first collection of child items can be obscured by the first parade. A first user input for raising a viewing angle along a second dimension (e.g., the height dimension) of the 3D space can be received (306). In response to the first user input, the hierarchy of items can be presented in the 3D space in a second viewing mode (308). In the second viewing mode, items within the same level as the first parent item can be presented in a second parade browsable along the first dimension across the 3D space, and the second parade is revealed from behind the first parade along a third dimension (e.g., the depth dimension) of the 3D space.

In some implementations, in the process 300, while in the second viewing mode, one or more additional levels of items above the level associated with the first parent item can be presented in one or more additional parades in the viewable region of the 3D space (310). The second parade and the one or more additional parades can be revealed from behind the second parade at increasing depths along the third dimension into the 3D space.

In some implementations, a respective ancestor item of the first collection of child items can be highlighted in each of the second parade and the one or more additional parades presented in the viewable region of the 3D space.

In some implementations, the hierarchy of items can represent a file system hierarchy, each parent item can represent a folder, and child items of the parent item can represent content items contained in the folder.

Figure 4A:
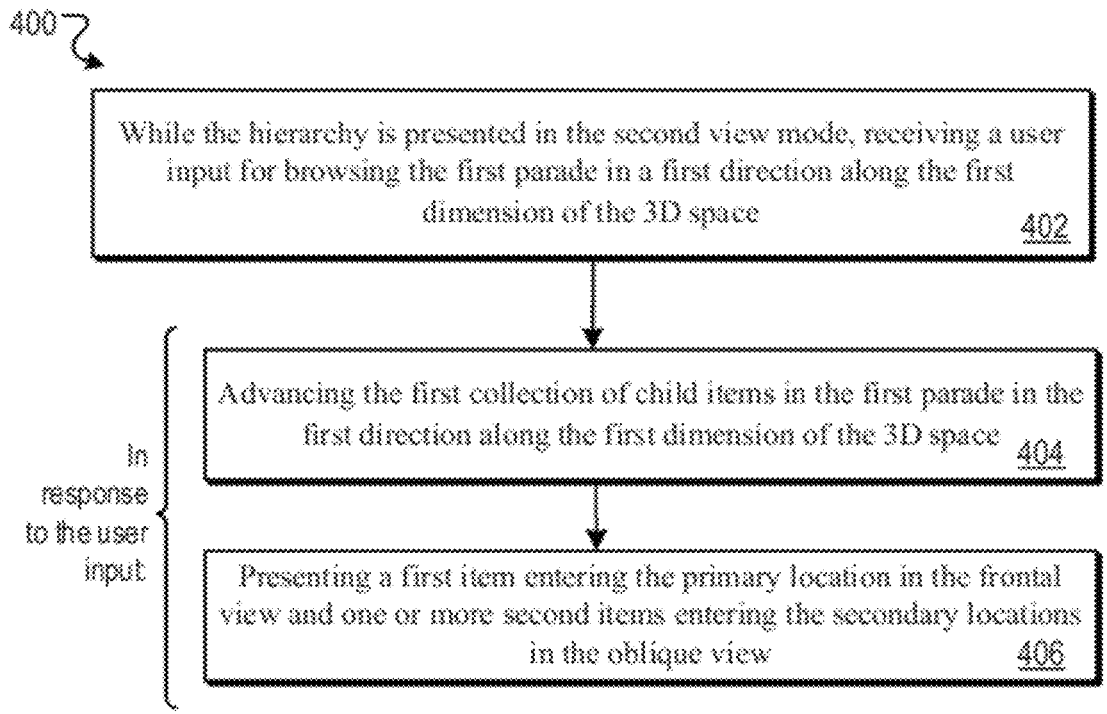
FIG. 4A is a flow diagram of an exemplary process for browsing a front parade along a lateral dimension across the 3D space.

FIG. 4A is a flow diagram of an exemplary process 400 for browsing a front parade along a lateral dimension across the 3D space.

In some implementations, the first parade is operable to advance through a series of locations along the first dimension (e.g., the lateral dimension) across the 3D space, where the series of locations include a primary location and one or more secondary locations preceding and succeeding the primary location along the first dimension, and each item is presented in a frontal view when occupying the primary location and in an oblique view when occupying one of the secondary locations.

In the process 400, while the hierarchy is presented in the second view mode, a user input for browsing the first parade in a first direction along the first dimension of the 3D space can be received (402). In response to the user input, the first collection of child items in the first parade can be advanced in the first direction along the first dimension (e.g., the lateral dimension) of the 3D space (404). In addition, a first item entering the primary location can be presented in the frontal view and one or more second items entering the secondary locations can be presented in the oblique view (406).

Figure 4B:
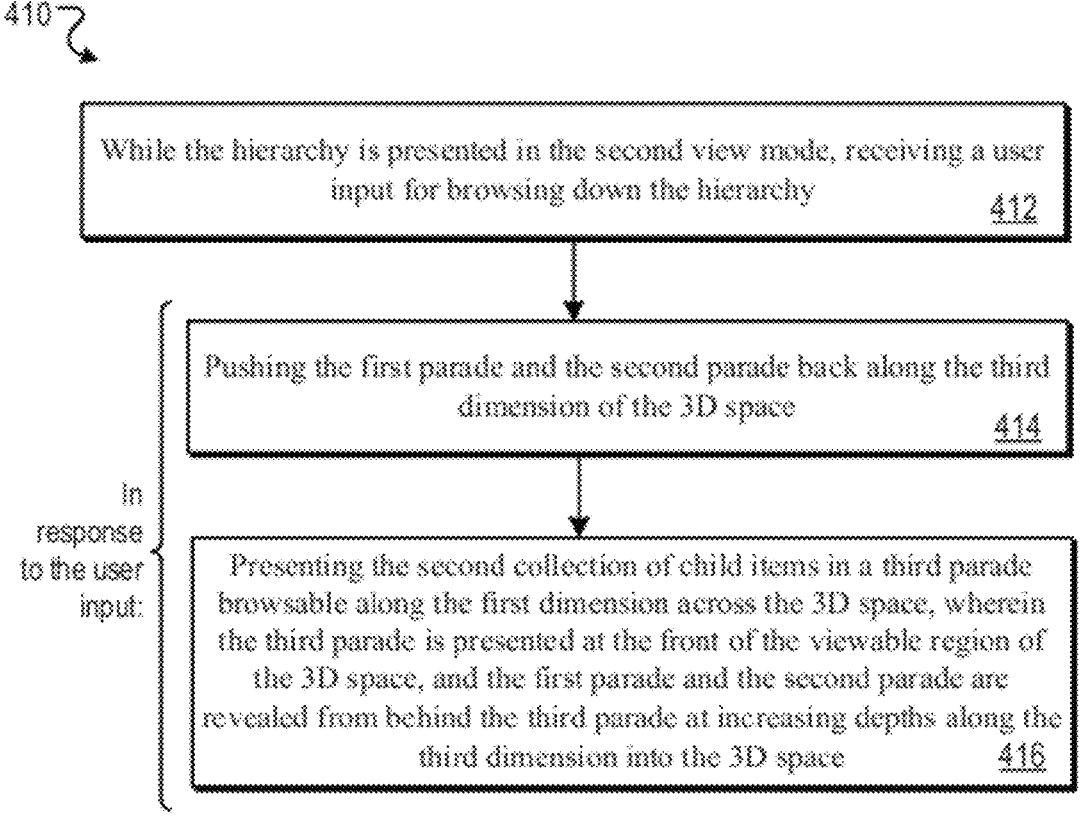
FIG. 4B is a flow diagram of an exemplary process for browsing down the hierarchy in the second viewing mode.

FIG. 4B is a flow diagram of an exemplary process 410 for browsing down the hierarchy in the second viewing mode.

In the process 410, the first item entering the primary location is a parent item of a second collection of child items. While the hierarchy is presented in the second view mode, a user input for browsing down the hierarchy can be received (412). In response to the user input, the first parade and the second parade can be pushed back along the third dimension of the 3D space (414). In addition, the second collection of child items can be presented in a third parade browsable along the first dimension (e.g., the lateral dimension) across the 3D space (416). The third parade can be presented at the front of the viewable region of the 3D space, and the first parade and the second parade can be revealed from behind the third parade at increasing depths along the third dimension into the 3D space.

In some implementations, the viewing angle can be lowered to return to the first viewing mode. For example, while the hierarchy is presented in the second view mode, a user input for lowering the viewing angle along the second dimension of the 3D space can be received. In response to the user input, the second collection of child items can be presented in the first viewing mode, where in the first viewing mode, the third parade including the second collection of child items can be presented at the front of the viewable region of the 3D space while items from levels above a level associated with the second collection of child items can be obscured by the third parade.

Figure 4C:
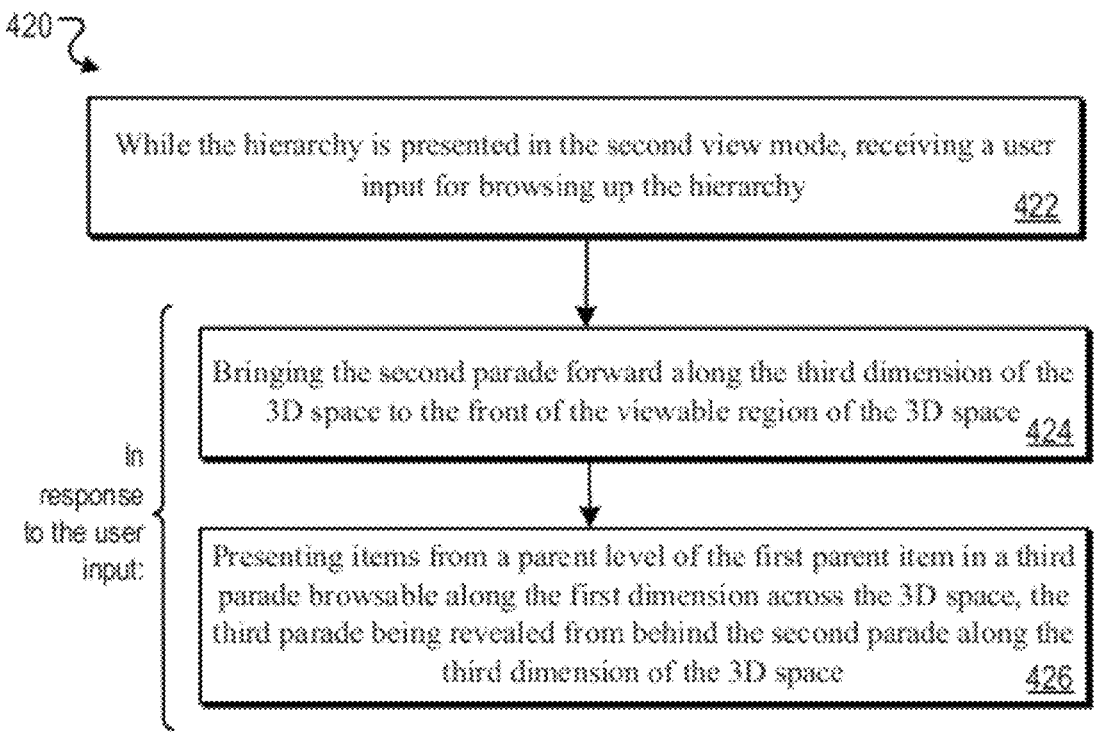
FIG. 4C is a flow diagram of an exemplary process for browsing up the hierarchy in the second viewing mode.

FIG. 4C is a flow diagram of an exemplary process 420 for browsing up the hierarchy in the second viewing mode.

In the process 420, while the hierarchy is presented in the second view mode, a user input for browsing up the hierarchy can be received (422). In response to the user input, the second parade can be brought forward along the third dimension (e.g., the depth dimension) of the 3D space to the front of the viewable region of the 3D space (424). In addition, items from a parent level of the first parent item can be presented in a third parade browsable along the first dimension across the 3D space, where the third parade is revealed from behind the second parade along the third dimension of the 3D space (426).

Figure 4D:
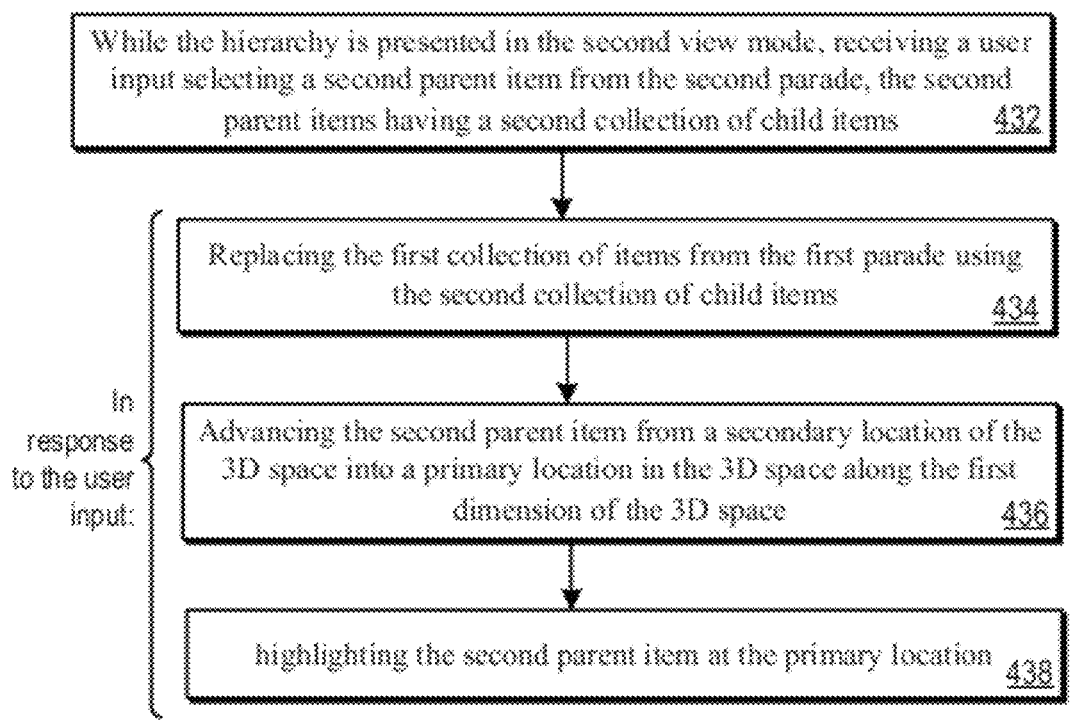
FIG. 4D is a flow diagram of an exemplary process for browsing a parent-level parade along a lateral dimension across the 3D space.

FIG. 4D is a flow diagram of an exemplary process 430 for browsing a parent level parade along a lateral dimension across the 3D space.

In the process 430, while the hierarchy is presented in the second view mode, a user input selecting a second parent item from the second parade can be received, the second parent items having a second collection of child items (432). In response to the user input, the first collection of items can be replaced from the first parade using the second collection of child items (434). In addition, the second parent item can be advanced from a secondary location of the 3D space into a primary location in the 3D space along the first dimension of the 3D space (436). Optionally, the second parent item at the primary location can be highlighted (438).

Figure 5:
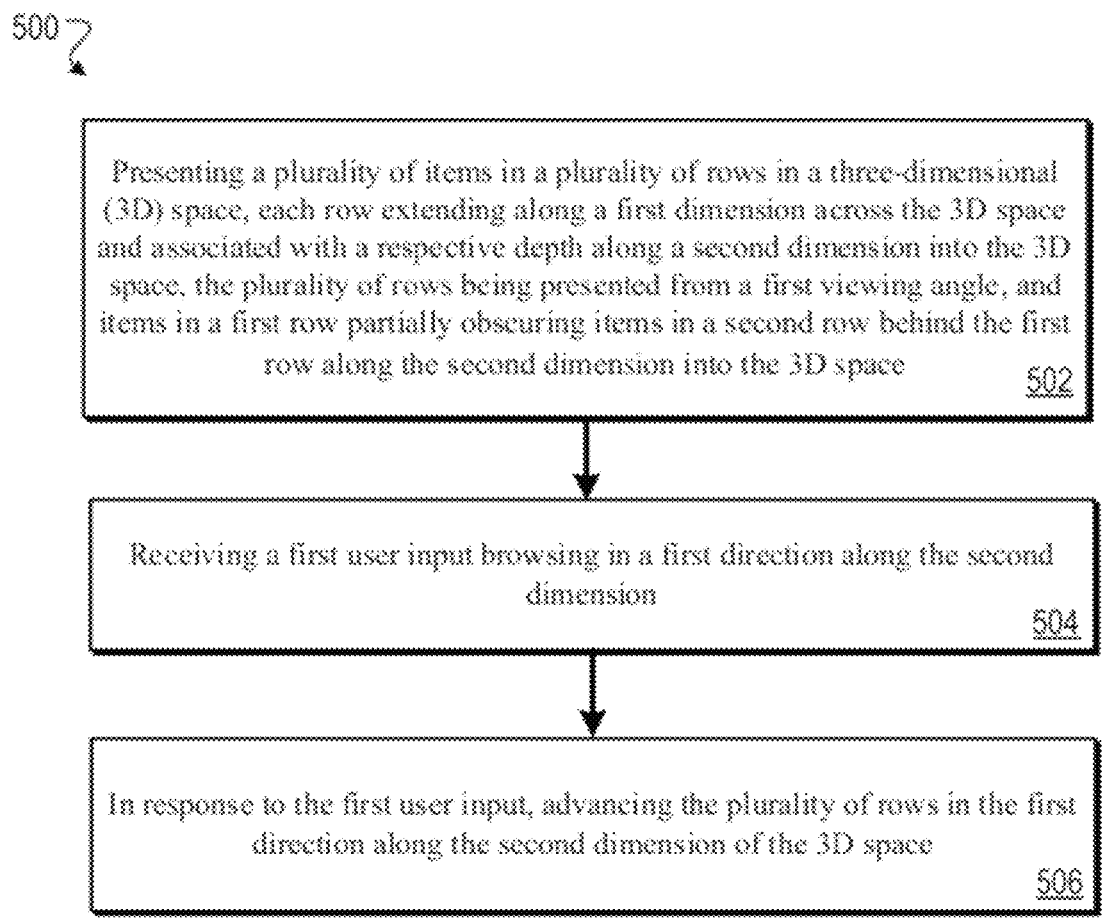
FIG. 5 is a flow diagram of an exemplary process for browsing a plurality of items presented in an array of successive rows in a 3D space.

FIG. 5 is a flow diagram of an exemplary process 500 for browsing a plurality of items presented in an array of successive rows in a 3D space.

In the process 500, a plurality of items can be presented in a plurality of rows in a 3D space (502). Each row can extend along a first dimension (e.g., the lateral dimension)

across the 3D space and be associated with a respective depth along a second dimension (e.g., the depth dimension) into the 3D space. The plurality of rows can be presented from a first viewing angle, and items in a first row can partially obscure items in a second row behind the first row along the second dimension (e.g., the depth dimension) into the 3D space. A user input browsing in a first direction along the second dimension can be received (504). In response to the user input, the plurality of rows can be advanced in the first direction along the second dimension of the 3D space (506).

Figure 6A:
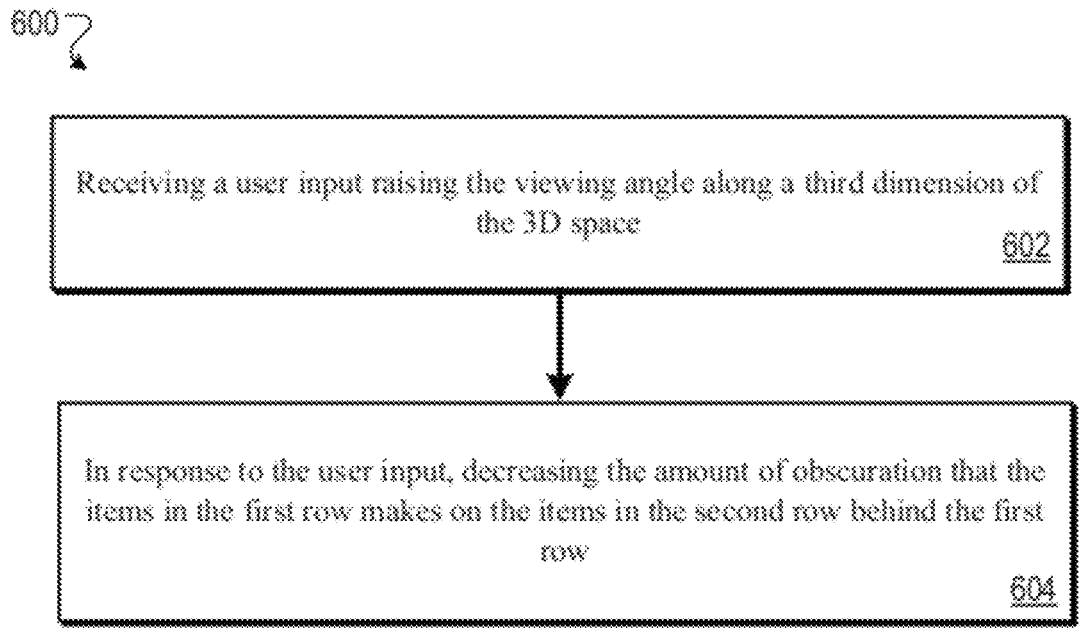
FIG. 6A is a flow diagram of an exemplary process for varying a viewing angle of the 3D space.

FIG. 6A is a flow diagram of an exemplary process 600 for varying a viewing angle of the 3D space.

In the process 600, a user input raising the viewing angle along a third dimension of the 3D space can be received (602). In response to the user input, the amount of obscuration that the items in the first row makes on the items in the second row behind the first row can be decreased (604).

Figure 6B:
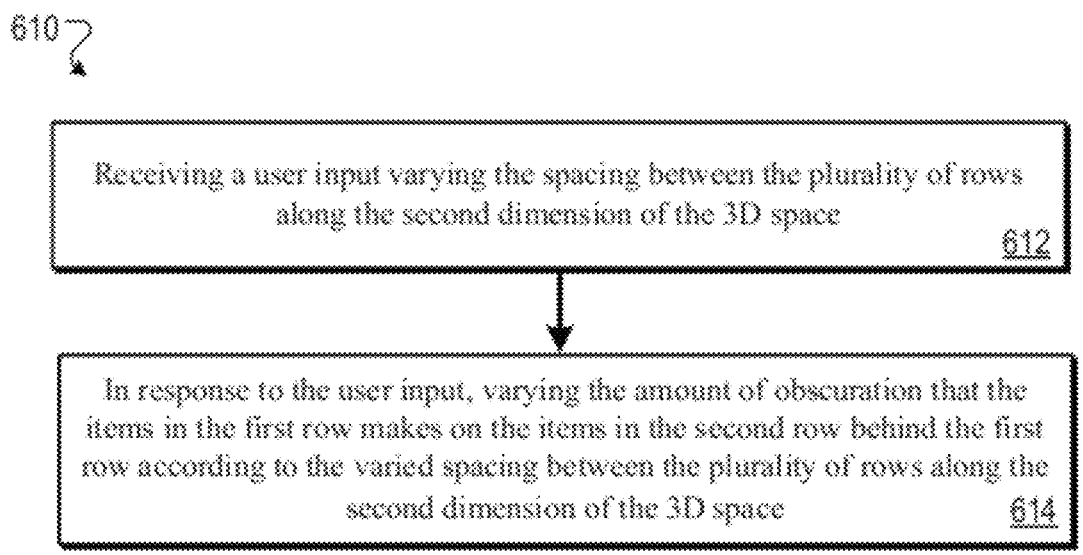
FIG. 6B is a flow diagram of an exemplary process for varying a spacing between the successive rows in the 3D space.

FIG. 6B is a flow diagram of an exemplary process 610 for varying a spacing between the successive rows in the 3D space.

In the process 610, a user input varying the spacing between the plurality of rows along the second dimension of the 3D space can be received (612). In response to the user input, the amount of obscuration that the items in the first row makes on the items in the second row behind the first row can be varied according to the varied spacing between the plurality of rows along the second dimension of the 3D space (614).

FIG. 7 is a flow diagram of another exemplary process 700 for presenting a hierarchy in a 3D space and transitioning from a first viewing mode to a second viewing mode.

In the example process 700, the operating system can cause a first collection of items to be presented along a first path in a two-dimensional (2D) space presented on a display of the device, where the first collection of items include child items of a first parent item in a hierarchy of items, and the first collection of items are operable to advance along the first path (702). The operating system can detect a first input for instructing a transition from the 2D space to a three-dimensional (3D) space having a raised viewing angle (704). In response to detecting the first input, the operating system can cause one or more additional collections of items to be presented in a displayed region of the 3D space, where each additional collection of items are sibling items of a respective ancestor item of the first collection of items in the hierarchy, and are presented along a respective predetermined path at a respective depth into the 3D space, the respective depth being based on a respective level associated with the respective ancestor item in the hierarchy (706).

In some implementations, at least one of the ancestor items is highlighted in the respective path presenting the ancestor item.

In some implementations, at least the additional collection of items containing the first parent item is operable to advance along the respective path associated with the additional collection of items, the respective path including a primary location and one or more secondary locations proximate the primary location, and the first parent item occupying the primary location of the respective path.

In some implementations, the operating system can detect a second input for instructing a transition of occupancy at the primary location to a second parent item in the additional collection of items containing the first parent item. In response to detecting the second input, the operating system can cause a second collection of items to be presented along the first path in the displayed region of the 3D space, the second collection of items being child items of the second parent item in the hierarchy.

In some implementations, the first path includes a first series of locations, the first series of locations includes a primary location and one or more secondary locations proximate the primary location along the first path, a first item of the first collection of item occupies the primary location of the first path and is a parent item of a second collection of items. The operating system can detect a second input for browsing down the hierarchy. In response to detecting the second input, the operating system can cause the first collection of items and the one or more additional collections of items to recede along a depth dimension of the 3D space; and cause the second collection of items to be presented along a respective path in front of the first collection of items in the displayed region of the 3D space.

In some implementations, while in the second display mode, the operating system can detect a second input for browsing up the hierarchy. In response to detecting the second input, the operating system can cause the first collection of items and the one or more additional collections of items to advance along a depth dimension of the 3D space, such that items from a level above the levels associated with the one or more additional collection of items become visible in the displayed region of the 3D space.

FIG. 8 is a flow diagram of another exemplary process 800 for presenting a hierarchy in a 3D space and transitioning from a first viewing mode to a second viewing mode.

In the example process 800, the operating system can identify a hierarchy of items, the hierarchy including a plurality of levels, each item being either a root level item within a root level of the hierarchy or a child item within a first level of the hierarchy that descends from a respective parent item within a second level of the hierarchy above the first level (802). The operating system can cause a first collection of child items to be presented in a three-dimensional (3D) space in a first viewing mode, where the first collection of child items descend from a first parent item in the hierarchy and are presented along a first predetermined path across the 3D space to form a first parade, and where in the first viewing mode, the first parade is presented in front of items from one or more levels above a level associated with the first collection of child items and obscures the items from the one or more levels (804). The operating system can detect a first input for raising a viewing angle of the 3D space (806). In response to the first input, the operating system can cause the hierarchy of items to be presented in a second viewing mode, where in the second viewing mode, items within a same level as the first parent item are presented along a second predetermined path across the 3D space to form a second parade, and the second parade is revealed from behind the first parade along a depth dimension of the 3D space (808).

In some implementations, in the second viewing mode, the operating system can cause one or more additional levels of items above a level associated with the first parent item to be presented in one or more additional predetermined paths in the displayed region of the 3D space to form one or more additional parades, the one or more additional parades being revealed from behind the second parade at increasing depths along the depth dimension of the 3D space.

In some implementations, a respective ancestor item of the first collection of child items is highlighted in each of the second parade and the one or more additional parades presented in the displayed region of the 3D space.

In some implementations, the hierarchy of items represents a file system hierarchy, and each parent item represents a folder, and child items of the parent item represent content items contained in the folder.

In some implementations, the first collection of child items is operable to advance through a series of locations along the first predetermined path, the series of locations including a primary location and one or more secondary locations proximate the primary location, and each item is presented in a frontal view when occupying the primary location and in an oblique view when occupying one of the secondary locations.

In some implementations, an item currently occupying the primary location is a parent item of a second collection of child items. While the hierarchy is presented in the second viewing mode, the operating system can detect a second input for browsing down the hierarchy. In response to the second input, the operating system can cause the first parade and the second parade to recede along the depth dimension of the 3D space, and the operating system can cause the second collection of child items to be presented along a third predetermined path to form a third parade, where the third parade is presented in front of the first parade in the displayed region of the 3D space, and the first parade and the second parade are revealed from behind the third parade at increasing depths along the depth dimension of the 3D space.

In some implementations, while the hierarchy is presented in the second viewing mode, the operating system can detect a third input for lowering the viewing angle of the 3D space. In response to the third input, the operating system can cause the second collection of child items to be presented in the first viewing mode, where in the first viewing mode, the third parade including the second collection of child items is presented in front of the first and the second parades in the displayed region of the 3D space along the depth dimension of the 3D space and obscuring the first and the second parades.

In some implementations, while the hierarchy is presented in the second viewing mode, the operating system can detect a second input for browsing up the hierarchy. In response to the second input, the operating system can cause the second parade to advance along the depth dimension of the 3D space towards the front of the displayed region of the 3D space, and cause items from a parent level of the first parent item to be presented along a third predetermined path in the 3D space to form a third parade, the third parade being revealed from behind the second parade along the depth dimension of the 3D space.

In some implementations, while the hierarchy is presented in the second viewing mode, the operating system can detect a second input selecting a second parent item from the second parade, the second parent items having a second collection of child items. In response to the second input, the operating system can replace the first collection of child items presented along the first predetermined path with the second collection of child items, and cause the second parent item to advance from a secondary location of the second predetermined path to a primary location along the second predetermined path. The operating system can also highlight the second parent item at the primary location.

Other processes implementing one or more aspects of the user interfaces and functionalities described with respect to FIGS. 1A-2B are possible.

Exemplary Computing Devices

Figure 9:
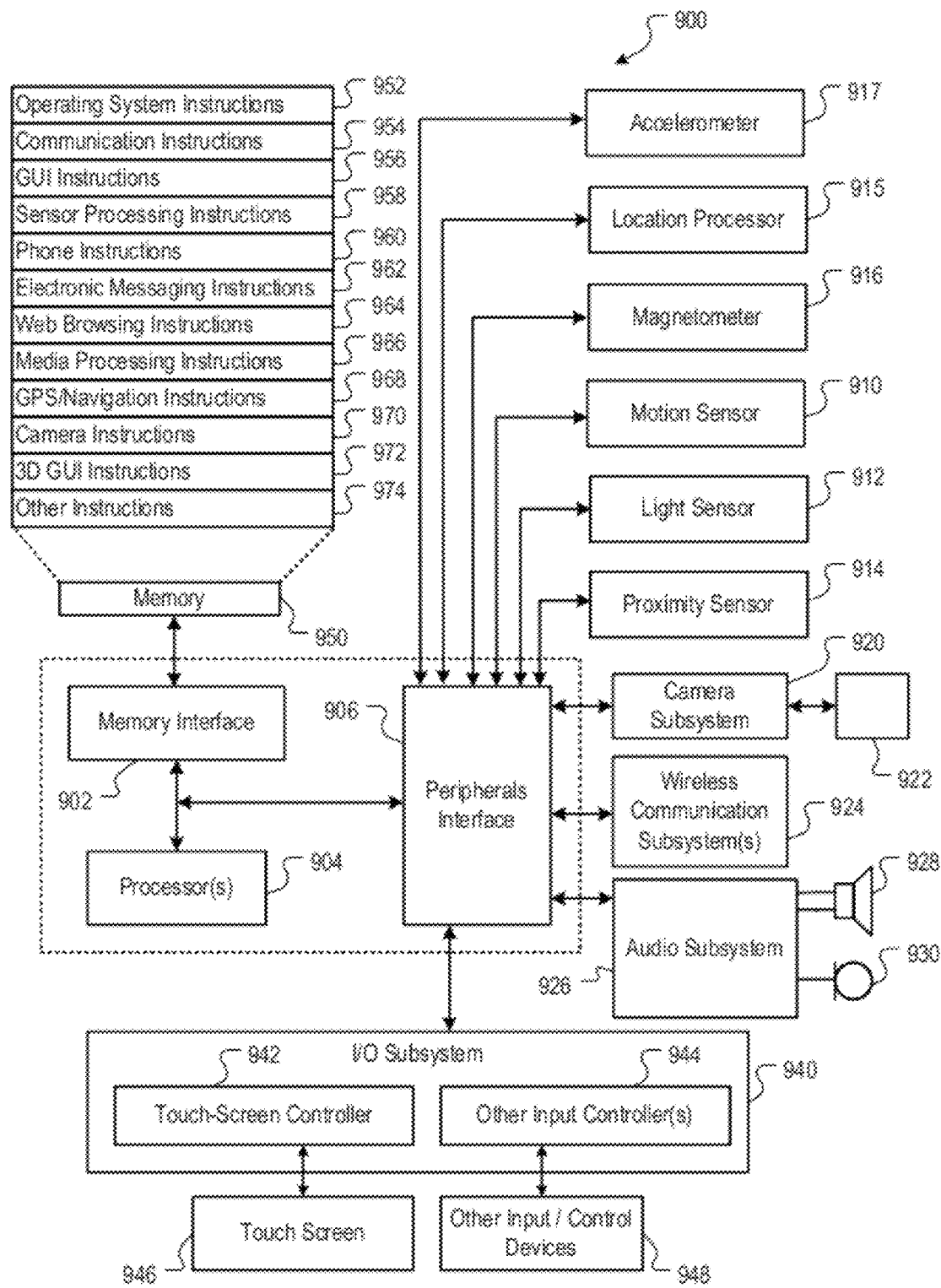
FIG. 9 is a block diagram of an exemplary hardware architecture for implementing the features and processes described in reference to FIGS. 1A-8.

FIG. 9 is a block diagram of an exemplary hardware architecture 900 for implementing the features and processes described in reference to FIGS. 1A-8. Although the architecture shown is for a mobile device (e.g., smart phone, electronic tablet, game device, etc.), the processes and features described in reference to FIGS. 1A-8 can also be implemented by other architectures, including but not limited to: desktop and server computers, game consoles, televisions, etc. For example, all or some of the user interfaces disclosed can be presented by a server computer on a network as web pages. The device can include memory interface 902, one or more data processors, image processors and/or processors 904, and peripherals interface 906. Memory interface 902, one or more processors 904 and/or peripherals interface 906 can be separate components or can be integrated in one or more integrated circuits. The various components in the device, for example, can be coupled by one or more communication buses or signal lines.

Sensors, devices, and subsystems can be coupled to peripherals interface 906 to facilitate multiple functionalities. For example, motion sensor 910, light sensor 912, and proximity sensor 914 can be coupled to peripherals interface 906 to facilitate orientation, lighting, and proximity functions of the mobile device. Location processor 915 (e.g., GPS receiver) can be connected to peripherals interface 906 to provide geopositioning. Electronic magnetometer 916 (e.g., an integrated circuit chip) can also be connected to peripherals interface 906 to provide data that can be used to determine the direction of magnetic North. Thus, electronic magnetometer 916 can be used as an electronic compass. Accelerometer 917 can also be connected to peripherals interface 906 to provide data that can be used to determine change of speed and direction of movement of the mobile device.

Camera subsystem 920 and an optical sensor 922, e.g., a charged coupled device (CCD) or a complementary metal-oxide semiconductor (CMOS) optical sensor, can be utilized to facilitate camera functions, such as recording photographs and video clips.

Communication functions can be facilitated through one or more wireless communication subsystems 924, which can include radio frequency receivers and transmitters and/or optical (e.g., infrared) receivers and transmitters. The specific design and implementation of the communication subsystem 924 can depend on the communication network(s) over which a mobile device is intended to operate. For example, a mobile device can include communication subsystems 924 designed to operate over a GSM network, a GPRS network, an EDGE network, a WiFi or WiMax network, and a Bluetooth network. In particular, the wireless communication subsystems 924 can include hosting protocols such that the mobile device can be configured as a base station for other wireless devices.

Audio subsystem 926 can be coupled to a speaker 928 and a microphone 930 to facilitate voice-enabled functions, such as voice recognition, voice replication, digital recording, and telephony functions.

I/O subsystem 940 can include touch screen controller 942 and/or other input controller(s) 944. Touch-screen controller 942 can be coupled to a touch screen 946 or pad. Touch screen 946 and touch screen controller 942 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with touch screen 946.

Other input controller(s) 944 can be coupled to other input/control devices 948, such as one or more buttons, rocker switches, thumb-wheel, infrared port, USB port, and/or a pointer device such as a stylus. The one or more buttons (not shown) can include an up/down button for volume control of speaker 928 and/or microphone 930.

In one implementation, a pressing of the button for a first duration may disengage a lock of the touch screen 946; and a pressing of the button for a second duration that is longer than the first duration may turn power to the device on or off. The user may be able to customize a functionality of one or more of the buttons. The touch screen 946 can, for example, also be used to implement virtual or soft buttons and/or a keyboard.

In some implementations, the device can present recorded audio and/or video files, such as MP3, AAC, and MPEG files. In some implementations, the device can include the functionality of an MP3 player, such as an iPod™. The device may, therefore, include a pin connector that is compatible with the iPod. Other input/output and control devices can also be used.

Memory interface 902 can be coupled to memory 950. Memory 950 can include high-speed random access memory and/or non-volatile memory, such as one or more magnetic disk storage devices, one or more optical storage devices, and/or flash memory (e.g., NAND, NOR). Memory 950 can store operating system 952, such as Darwin, RTXC, LINUX, UNIX, OS X, WINDOWS, or an embedded operating system such as VxWorks. Operating system 952 may include instructions for handling basic system services and for performing hardware dependent tasks. In some implementations, operating system 952 can include a kernel (e.g., UNIX kernel).

Memory 950 may also store communication instructions 954 to facilitate communicating with one or more additional devices, one or more computers and/or one or more servers. Memory 950 may include graphical user interface instructions 956 to facilitate graphic user interface processing, such as the user interfaces illustrated in FIGS. 1A-2B; sensor processing instructions 958 to facilitate sensor-related processing and functions; phone instructions 960 to facilitate phone-related processes and functions; electronic messaging instructions 962 to facilitate electronic-messaging related processes and functions, such as SMS and MMS; web browsing instructions 964 to facilitate web browsing-related processes and functions; media processing instructions 966 to facilitate media processing-related processes and functions; GPS/Navigation instructions 968 to facilitate GPS and navigation-related processes and instructions; and camera instructions 970 to facilitate camera-related processes and functions. The memory 950 may also store other software instructions (not shown), such as security instructions, web video instructions to facilitate web video-related processes and functions, and/or web shopping instructions to facilitate web shopping-related processes and functions.

Memory 950 can include 3D GUI instructions 972 for implementing the features, user interfaces, and processes described in reference to FIGS. 1A-8. The 3D GUI instructions 972 can interact with or be part of the graphical user interface instructions 956. Memory 950 can also include other instructions 974 for implementing other functionalities.

Each of the above identified instructions and applications can correspond to a set of instructions for performing one or more functions described above. These instructions need not be implemented as separate software programs, procedures, or modules. Memory 950 can include additional instructions or fewer instructions. Furthermore, various functions of the mobile device may be implemented in hardware and/or in software, including in one or more signal processing and/or application specific integrated circuits.

The features described can be implemented in digital electronic circuitry, or in computer hardware, firmware, software, or in combinations of them. The features can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., Objective-C, Java), including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semi-conductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network. The relationship of client and server arises by virtue of computer programs running on the respective computers and having a client-server relationship to each other.

One or more features or steps of the disclosed embodiments can be implemented using an API. An API can define on or more parameters that are passed between a calling application and other software code (e.g., an operating system, library routine, function) that provides a service, that provides data, or that performs an operation or a computation.

The API can be implemented as one or more calls in program code that send or receive one or more parameters through a parameter list or other structure based on a call convention defined in an API specification document. A parameter can be a constant, a key, a data structure, an object, an object class, a variable, a data type, a pointer, an array, a list, or another call. API calls and parameters can be implemented in any programming language. The programming language can define the vocabulary and calling convention that a programmer will employ to access functions supporting the API.

In some implementations, an API call can report to an application the capabilities of a device running the application, such as input capability, output capability, processing capability, power capability, communications capability, etc.

A number of implementations have been described. Nevertheless, it will be understood that various modifications may be made. For example, elements of one or more implementations may be combined, deleted, modified, or supplemented to form further implementations. As yet another example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A computer-implemented method performed by one or more data processing apparatus, comprising:
    identifying a hierarchy of items, the hierarchy including a plurality of levels, each item being either a root level item within a root level of the hierarchy or a child item within a first level of the hierarchy that descends from a respective parent item within a second level of the hierarchy above the first level;
    causing a first collection of child items to be presented in a three-dimensional (3D) space in a first viewing mode, wherein the first collection of child items descend from a first parent item in the hierarchy and are presented along a first predetermined path across the 3D space to form a first parade, the first collection of child items operable to advance along the first predetermined path, and wherein in the first viewing mode, the first parade is presented in front of items from one or more levels above a level associated with the first collection of child items and obscures the items from the one or more levels;
    detecting a first input for raising a viewing angle of the 3D space; and
    in response to the first input, causing the hierarchy of items to be presented in a second viewing mode, wherein in the second viewing mode, items within a same level as the first parent item are presented along a second predetermined path across the 3D space to form a second parade, the items within the same level operable to advance along the second predetermined path, and the second parade is revealed from behind the first parade along a depth dimension of the 3D space.

2. The method of claim 1, further comprising:
    in the second viewing mode, causing one or more additional levels of items above a level associated with the first parent item to be presented in one or more additional predetermined paths in the displayed region of the 3D space to form one or more additional parades, the one or more additional parades being revealed from behind the second parade at increasing depths along the depth dimension of the 3D space.

3. The method of claim 2, wherein a respective ancestor item of the first collection of child items is highlighted in each of the second parade and the one or more additional parades is presented in the displayed region of the 3D space.

4. The method of claim 1, wherein the hierarchy of items represents a file system hierarchy, and each parent item represents a folder, and child items of the parent item represent content items contained in the folder.

5. The method of claim 1, wherein the first collection of child items is operable to advance through a series of locations along the first predetermined path, the series of locations including a primary location and one or more secondary locations proximate the primary location, and each item is presented in a frontal view when occupying the primary location and in an oblique view when occupying one of the secondary locations.

6. The method of claim 5, wherein an item currently occupying the primary location is a parent item of a second collection of child items, and the method further comprises:
    while the hierarchy is presented in the second viewing mode, detecting a second input for browsing down the hierarchy; and
    in response to the second input:
        causing the first parade and the second parade to recede along the depth dimension of the 3D space; and
        causing the second collection of child items to be presented along a third predetermined path to form a third parade, wherein the third parade is presented in front of the first parade in the displayed region of the 3D space, and the first parade and the second parade are revealed from behind the third parade at increasing depths along the depth dimension of the 3D space.

7. The method of claim 6, further comprising:
    while the hierarchy is presented in the second viewing mode, detecting a third input for lowering the viewing angle of the 3D space; and
    in response to the third input, causing the second collection of child items to be presented in the first viewing mode, wherein in the first viewing mode, the third parade including the second collection of child items is presented in front of the first and the second parades in the displayed region of the 3D space along the depth dimension of the 3D space and obscuring the first and the second parades.

8. The method of claim 1, further comprising:
    while the hierarchy is presented in the second viewing mode, detecting a second input for browsing up the hierarchy; and
    in response to the second input:
        causing the second parade to advance along the depth dimension of the 3D space towards the front of the displayed region of the 3D space; and causing items from a parent level of the first parent item to be presented along a third predetermined path in the 3D space to form a third parade, the third parade being revealed from behind the second parade along the depth dimension of the 3D space.

9. The method of claim 1, further comprising:
while the hierarchy is presented in the second viewing mode, detecting a second input selecting a second parent item from the second parade, the second parent items having a second collection of child items; and
in response to the second input:
replacing the first collection of child items presented along the first predetermined path with the second collection of child items; and
causing the second parent item to advance from a secondary location of the second predetermined path to a primary location along the second predetermined path; and
highlighting the second parent item at the primary location.

10. A non-transitory computer-readable medium having instructions stored thereon, which, when executed by one or more processors, cause the one or more processors to perform operations comprising:
identifying a hierarchy of items, the hierarchy including a plurality of levels, each item being either a root level item within a root level of the hierarchy or a child item within a first level of the hierarchy that descends from a respective parent item within a second level of the hierarchy above the first level;
causing a first collection of child items to be presented in a three-dimensional (3D) space in a first viewing mode, wherein the first collection of child items descend from a first parent item in the hierarchy and are presented along a first predetermined path across the 3D space to form a first parade, the first collection of child items operable to advance along the first predetermined path, and wherein in the first viewing mode, the first parade is presented in front of items from one or more levels above a level associated with the first collection of child items and obscures the items from the one or more levels;
detecting a first input for raising a viewing angle of the 3D space; and
in response to the first input, causing the hierarchy of items to be presented in a second viewing mode, wherein in the second viewing mode, items within a same level as the first parent item are presented along a second predetermined path across the 3D space to form a second parade, and the second parade is revealed from behind the first parade along a depth dimension of the 3D space.

11. The non-transitory machine-readable medium of claim 10, wherein the instructions further cause the one or more processors to perform operations comprising:
in the second viewing mode, causing one or more additional levels of items above a level associated with the first parent item to be presented in one or more additional predetermined paths in the displayed region of the 3D space to form one or more additional parades, the one or more additional parades being revealed from behind the second parade at increasing depths along the depth dimension of the 3D space.

12. The non-transitory machine-readable medium of claim 11, wherein a respective ancestor item of the first collection of child items is highlighted in each of the second parade and the one or more additional parades is presented in the displayed region of the 3D space.

13. The non-transitory machine-readable medium of claim 10, wherein the hierarchy of items represents a file system hierarchy, and each parent item represents a folder, and child items of the parent item represent content items contained in the folder.

14. The non-transitory machine-readable medium of claim 10, wherein the first collection of child items is operable to advance through a series of locations along the first predetermined path, the series of locations including a primary location and one or more secondary locations proximate the primary location, and each item is presented in a frontal view when occupying the primary location and in an oblique view when occupying one of the secondary locations.

15. The non-transitory machine-readable medium of claim 14, wherein an item currently occupying the primary location is a parent item of a second collection of child items, and wherein the instructions further cause the one or more processors to perform operations comprising:
while the hierarchy is presented in the second viewing mode, detecting a second input for browsing down the hierarchy; and
in response to the second input:
causing the first parade and the second parade to recede along the depth dimension of the 3D space; and
causing the second collection of child items to be presented along a third predetermined path to form a third parade, wherein the third parade is presented in front of the first parade in the displayed region of the 3D space, and the first parade and the second parade are revealed from behind the third parade at increasing depths along the depth dimension of the 3D space.

16. The non-transitory machine-readable medium of claim 15, wherein the instructions further cause the one or more processors to perform operations comprising:
while the hierarchy is presented in the second viewing mode, detecting a third input for lowering the viewing angle of the 3D space; and
in response to the third input, causing the second collection of child items to be presented in the first viewing mode, wherein in the first viewing mode, the third parade including the second collection of child items is presented in front of the first and the second parades in the displayed region of the 3D space along the depth dimension of the 3D space and obscuring the first and the second parades.

17. The non-transitory machine-readable medium of claim 10, wherein the instructions further cause the one or more processors to perform operations comprising:
while the hierarchy is presented in the second viewing mode, detecting a second input for browsing up the hierarchy; and
in response to the second input:
causing the second parade to advance along the depth dimension of the 3D space towards the front of the displayed region of the 3D space; and
causing items from a parent level of the first parent item to be presented along a third predetermined path in the 3D space to form a third parade, the third parade being
revealed from behind the second parade along the depth dimension of the 3D space.

18. The non-transitory machine-readable medium of claim 10, wherein the instructions further cause the one or more processors to perform operations comprising:

while the hierarchy is presented in the second viewing mode, detecting a second input selecting a second parent item from the second parade, the second parent items having a second collection of child items; and in response to the second input:
replacing the first collection of child items presented along the first predetermined path with the second collection of child items; and
causing the second parent item to advance from a secondary location of the second predetermined path to a primary location along the second predetermined path; and highlighting the second parent item at the primary location.

19. A system, comprising:
one or more processors; and
memory coupled to the one or more processors and storing instructions, the instructions, when executed by the one or more processors, cause the one or more processors to perform operations comprising:
identifying a hierarchy of items, the hierarchy including a plurality of levels, each item being either a root level item within a root level of the hierarchy or a child item within a first level of the hierarchy that descends from a respective parent item within a second level of the hierarchy above the first level;
causing a first collection of child items to be presented in a three-dimensional (3D) space in a first viewing mode, wherein the first collection of child items descend from a first parent item in the hierarchy and are presented along a first predetermined path across the 3D space to form a first parade, the first collection of child items operable to advance along the first predetermined path, and wherein in the first viewing mode, the first parade is presented in front of items from one or more levels above a level associated with the first collection of child items and obscures the items from the one or more levels;
detecting a first input for raising a viewing angle of the 3D space; and
in response to the first input, causing the hierarchy of items to be presented in a second viewing mode, wherein in the second viewing mode, items within a same level as the first parent item are presented along a second predetermined path across the 3D space to form a second parade, the items within the same level operable to advance along the second predetermined path, and the second parade is revealed from behind the first parade along a depth dimension of the 3D space.

20. The system of claim 19, wherein the instructions further cause the one or more processors to perform operations comprising:
in the second viewing mode, causing one or more additional levels of items above a level associated with the first parent item to be presented in one or more additional predetermined paths in the displayed region of the 3D space to form one or more additional parades, the one or more additional parades being revealed from behind the second parade at increasing depths along the depth dimension of the 3D space.

21. The system of claim 20, wherein a respective ancestor item of the first collection of child items is highlighted in each of the second parade and the one or more additional parades is presented in the displayed region of the 3D space.

22. The system of claim 19, wherein the hierarchy of items represents a file system hierarchy, and each parent item represents a folder, and child items of the parent item represent content items contained in the folder.

23. The system of claim 19, wherein the first collection of child items is operable to advance through a series of locations along the first predetermined path, the series of locations including a primary location and one or more secondary locations proximate the primary location, and each item is presented in a frontal view when occupying the primary location and in an oblique view when occupying one of the secondary locations.

24. The system of claim 23, wherein an item currently occupying the primary location is a parent item of a second collection of child items, and wherein the instructions further cause the one or more processors to perform operations comprising:
while the hierarchy is presented in the second viewing mode, detecting a second input for browsing down the hierarchy; and
in response to the second input:
causing the first parade and the second parade to recede along the depth dimension of the 3D space; and
causing the second collection of child items to be presented along a third predetermined path to form a third parade, wherein the third parade is presented in front of the first parade in the displayed region of the 3D space, and the first parade and the second parade are revealed from behind the third parade at increasing depths along the depth dimension of the 3D space.

25. The system of claim 24, wherein the instructions further cause the one or more processors to perform operations comprising:
while the hierarchy is presented in the second viewing mode, detecting a third input for lowering the viewing angle of the 3D space; and
in response to the third input, causing the second collection of child items to be presented in the first viewing mode, wherein in the first viewing mode, the third parade including the second collection of child items is presented in front of the first and the second parades in the displayed region of the 3D space along the depth dimension of the 3D space and obscuring the first and the second parades.

26. The system of claim 19, wherein the instructions further cause the one or more processors to perform operations comprising:
while the hierarchy is presented in the second viewing mode, detecting a second input for browsing up the hierarchy; and
in response to the second input:
causing the second parade to advance along the depth dimension of the 3D space towards the front of the displayed region of the 3D space; and
causing items from a parent level of the first parent item to be presented along a third predetermined path in the 3D space to form a third parade, the third parade being
revealed from behind the second parade along the depth dimension of the 3D space.

27. The system of claim 19, wherein the instructions further cause the one or more processors to perform operations comprising:
while the hierarchy is presented in the second viewing mode, detecting a second input selecting a second parent item from the second parade, the second parent items having a second collection of child items; and
in response to the second input:

replacing the first collection of child items presented along the first predetermined path with the second collection of child items; and causing the second parent item to advance from a secondary location of the second predetermined path to a primary location along the second predetermined path; and highlighting the second parent item at the primary location.

\* \* \* \* \*